(12) United States Patent
Kikuchi

(10) Patent No.: US 11,189,009 B2
(45) Date of Patent: Nov. 30, 2021

(54) IMAGE PROCESSING APPARATUS AND IMAGE PROCESSING METHOD

(71) Applicant: FUJIFILM Corporation, Tokyo (JP)

(72) Inventor: Hiroaki Kikuchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 16/553,586

(22) Filed: Aug. 28, 2019

(65) Prior Publication Data

US 2019/0385275 A1 Dec. 19, 2019

Related U.S. Application Data

(63) Continuation of application No. PCT/JP2018/010277, filed on Mar. 15, 2018.

(30) Foreign Application Priority Data

Mar. 30, 2017 (JP) .............................. JP2017-068560

(51) Int. Cl.
*G06T 3/00* (2006.01)
*G06T 7/00* (2017.01)
*G06T 7/38* (2017.01)

(52) U.S. Cl.
CPC ............ *G06T 3/0068* (2013.01); *G06T 7/001* (2013.01); *G06T 2207/10012* (2013.01)

(58) Field of Classification Search
None
See application file for complete search history.

(56) References Cited

U.S. PATENT DOCUMENTS 9,626,589 B1 * 4/2017 Graham ............... H04N 1/3876
10,562,643 B1 * 2/2020 Strabala ................ G08G 5/025
(Continued)

FOREIGN PATENT DOCUMENTS

JP H05-322778 A 12/1993
JP 2000-134537 A 5/2000
(Continued)

OTHER PUBLICATIONS

The extended European search report issued by the European Patent Office dated Dec. 10, 2019, which corresponds to EP18774567.4-1210 and is related to U.S. Appl. No. 16/553,586.
(Continued)

*Primary Examiner* — Randolph I Chu
(74) *Attorney, Agent, or Firm* — Studebaker & Brackett PC

(57) ABSTRACT

The present invention is directed to providing an image processing apparatus and an image processing method capable of easily obtaining a combined image and a developed image in a case where a construction formed of a plurality of planes is divisionally imaged. An image processing apparatus according to an aspect of the present invention includes an image acquisition unit that acquires a plurality of captured images obtained by respectively imaging different portions of a construction formed of a plurality of planes, a plane specifying unit that specifies common planes common to the plurality of captured images, an image conversion unit that performs projection conversion on images including the common planes among the plurality of captured images, to generate a plurality of converted images in which the common planes are aligned with each other, a combined image generation unit that generates a plane combined image in which the plurality of converted images are combined with each other on an identical plane, and a (Continued)

developed image generation unit that generates a developed image of the construction by connecting a plurality of the plane combined images to each other.

11 Claims, 18 Drawing Sheets

(56) References Cited

U.S. PATENT DOCUMENTS

| | | | | |
|---|---|---|---|---|
| 2002/0163582 | A1* | 11/2002 | Gruber | G01C 11/02 |
| | | | | 348/218.1 |
| 2005/0244059 | A1 | 11/2005 | Turski | |
| 2006/0291744 | A1 | 12/2006 | Ikeda et al. | |
| 2010/0194886 | A1* | 8/2010 | Asari | G06T 7/85 |
| | | | | 348/148 |
| 2010/0289881 | A1* | 11/2010 | Xu | H04N 5/23238 |
| | | | | 348/47 |
| 2011/0058014 | A1* | 3/2011 | Yamashita | H04N 5/23293 |
| | | | | 348/36 |
| 2013/0222556 | A1* | 8/2013 | Shimada | H04N 13/211 |
| | | | | 348/50 |
| 2016/0241836 | A1* | 8/2016 | Cole | H04N 13/189 |
| 2016/0360104 | A1* | 12/2016 | Zhang | H04N 13/239 |
| 2019/0020829 | A1* | 1/2019 | Nebiker | H04N 5/23238 |

FOREIGN PATENT DOCUMENTS

| | | |
|---|---|---|
| JP | 2004-021578 A | 1/2004 |
| JP | 2004-318790 A | 11/2004 |

OTHER PUBLICATIONS

Shinichi Goto et al., "3D Environment Measurement Using Binocular Stereo and Motion Stereo by Mobile Robot with Omnidirectional Stereo Camera", 2011 IEEE International Conference on Computer Vision Workshops, Nov. 6, 2011, pp. 296-303, XP032095253.
International Search Report issued in PCT/JP2018/010277; dated Jun. 19, 2018.
International Preliminary Report on Patentability and Written Opinion issued in PCT/JP2018/010277; dated Oct. 1, 2019.

* cited by examiner

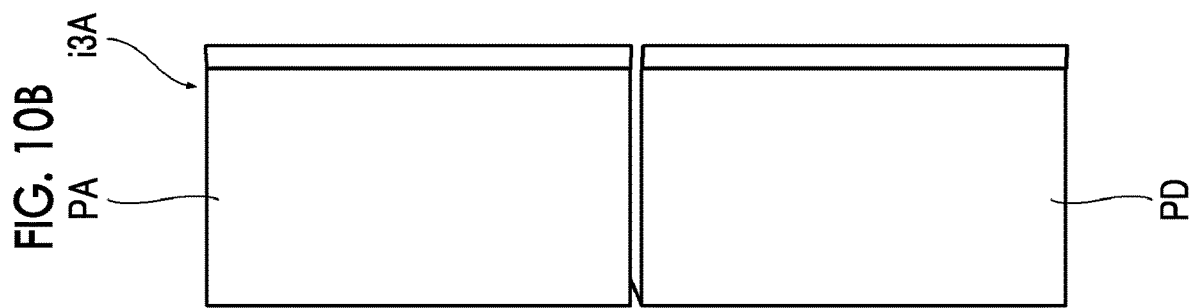
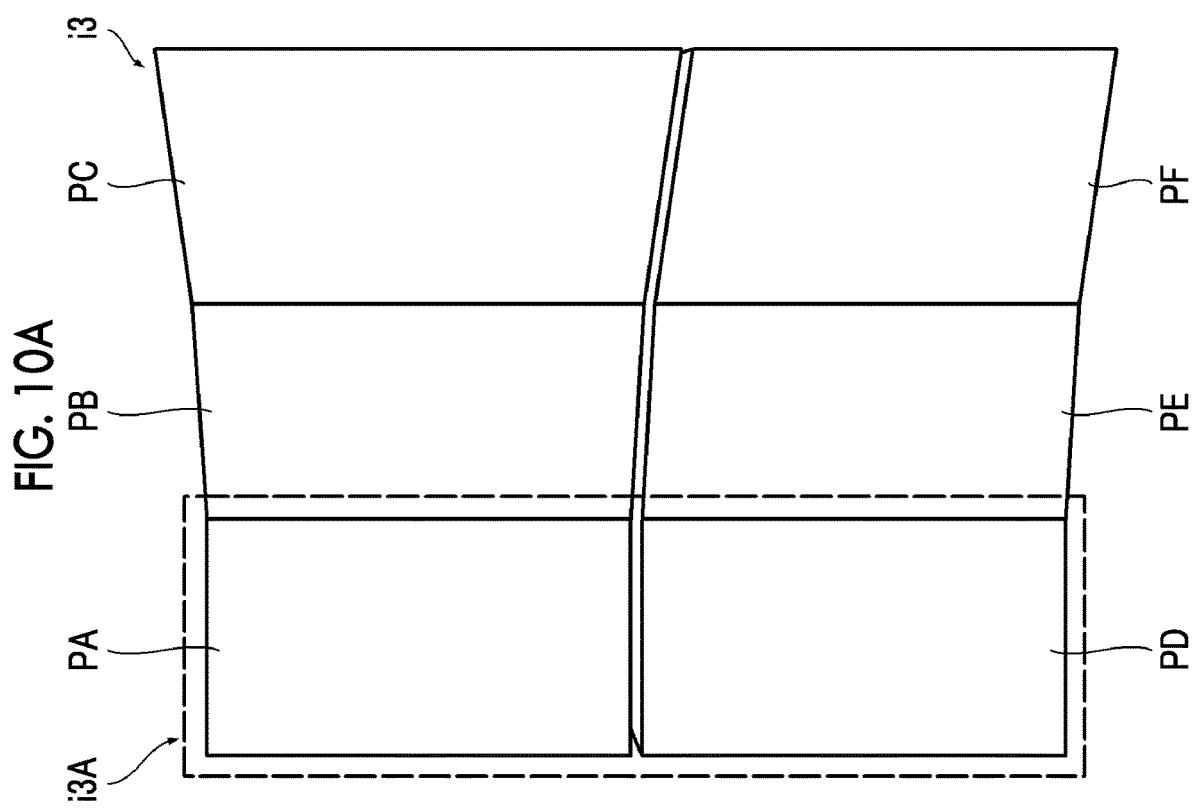

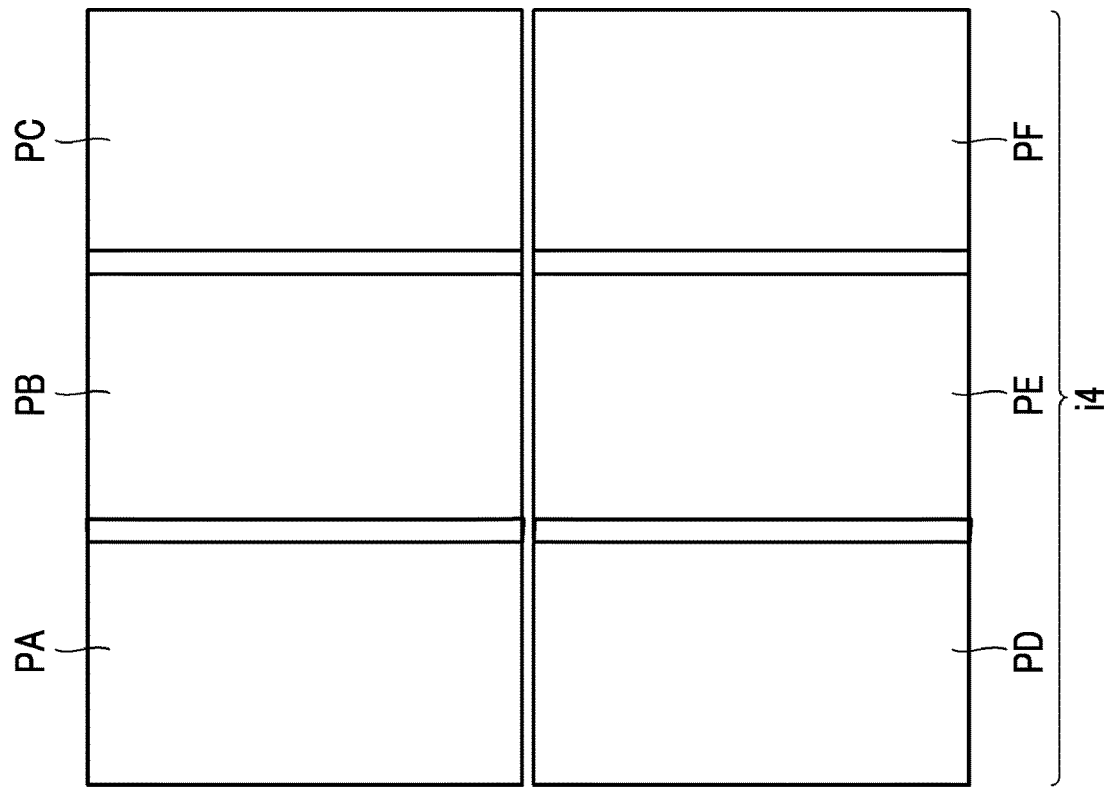
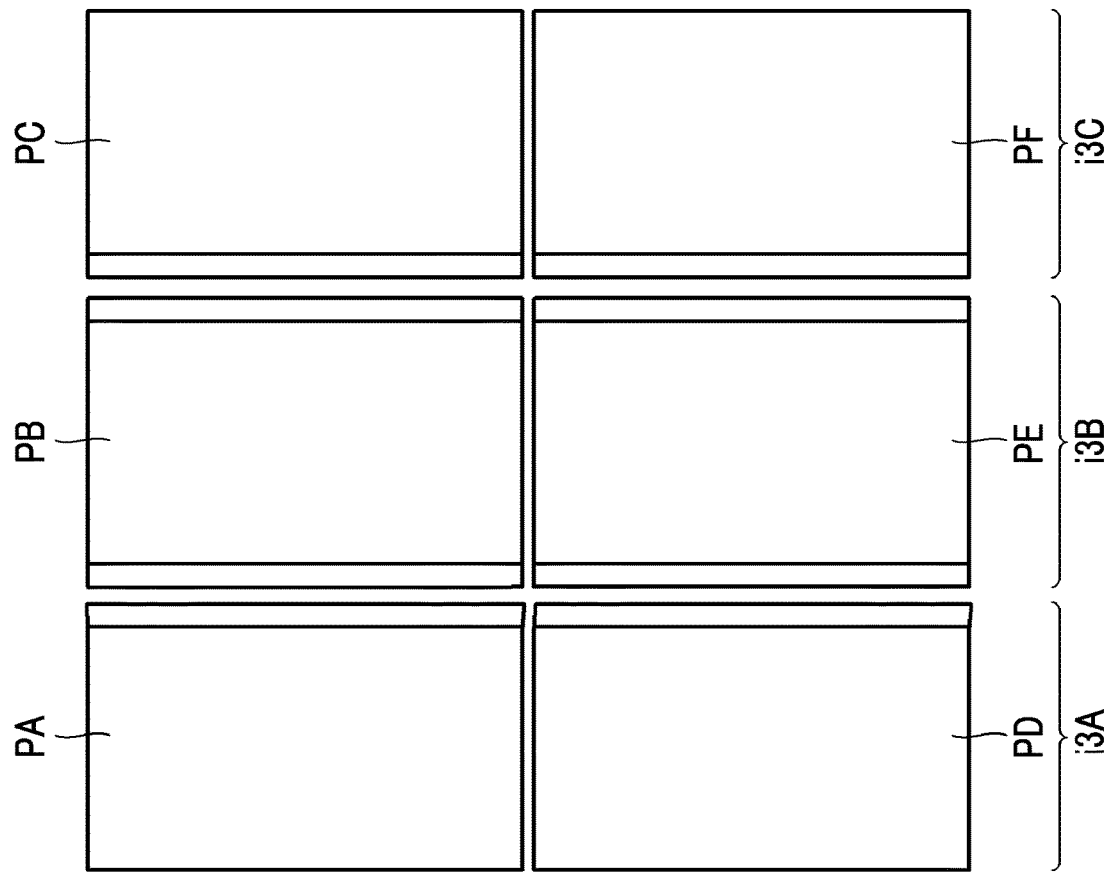

FIG. 13

| MEMBER NAME | MEMBER IDENTIFICATION INFORMATION | DAMAGE IDENTIFICATION INFORMATION | DAMAGE TYPE | DEGREE OF DAMAGE | DIMENSION | CAPTURED IMAGE | CAPTURING DATE |
|---|---|---|---|---|---|---|---|
| MAIN GIRDER | Mg0201 | Mg0201-01 | CORROSION | RANK b | 0.2m × 0.2m | PHOTO-1 | 06.17.2016 |
| FLOOR SLAB | Ds0402 | Ds0402-01 | CRACK | RANK b | WIDTH 0.5mm LENGTH 1.2m | PHOTO-2 | 06.17.2016 |

IMAGE PROCESSING APPARATUS AND IMAGE PROCESSING METHOD

CROSS-REFERENCE TO RELATED APPLICATIONS

The present application is a Continuation of PCT International Application No. PCT/JP2018/010277 filed on Mar. 15, 2018 claiming priority under 35 U.S.C. § 119(a) to Japanese Patent Application No. 2017-068560 filed on Mar. 30, 2017. Each of the above applications is hereby expressly incorporated by reference, in its entirety, into the present application.

BACKGROUND OF THE INVENTION

1. Field of the Invention

The present invention relates to an image processing apparatus and an image processing method, and particularly to an image processing apparatus and an image processing method capable of combining a plurality of images obtained by divisionally imaging a subject, into a single image.

2. Description of the Related Art

In recent years, inspection of a construction using an image acquired by an imaging device has been performed. An image of a construction is acquired during inspection, but a large construction is not included in a single image, and is thus often divisionally imaged such that a plurality of images are captured. The plurality of divisionally captured images are combined into a single image through image processing, and distortion of each image is corrected at this time.

For example, JP2004-021578A discloses a technique in which a plurality of divisionally captured images are input, distortion of each image is corrected, and then the plurality of images are combined into a single image. JP-H05-322778A discloses a technique in which images obtained by divisionally imaging a single surface (each of eastern, western, southern, and northern surfaces) of a construction such as a chimney are combined, and all images of the single surface are connected to each other to be generated as a developed image.

SUMMARY OF THE INVENTION

However, in a specific embodiment disclosed in JP2004-021578A, images of a plurality of small regions (small regions defined form lines) present on a single surface (substantially plane) of a bridge pier are merely combined with each other. Paragraph [0014] of the specification discloses that "an image is preferably a single image including as a wide range of a target concrete structure as possible, that is, as the entire concrete structure as possible", and, "in a case where a defect is distributed to a plurality of images, the entire defect is difficult to understand". Therefore, in a case where a target construction is formed of a plurality of planes in each direction or a target construction is divisionally imaged such that a plurality of images are captured, it is difficult to apply the technique disclosed in JP2004-021578A thereto. On the other hand, JP-H05-322778A discloses that images obtained by divisionally imaging a single surface of a construction are combined with each other, but a target construction has a simple shape such as that of a chimney or a bridge pier. Therefore, in the same manner as in JP2004-021578A, it is difficult to apply the technique disclosed in JP-H05-322778A to a case where a target construction is formed of a plurality of planes in each direction or a target construction is divisionally imaged such that a plurality of images are captured.

As mentioned above, in the related art, in a case where a construction formed of a plurality of planes is divisionally imaged, it is not easy to obtain a combined image and a developed image.

The present invention has been made in light of the circumstances, and an object thereof is to provide an image processing apparatus and an image processing method capable of easily obtaining a combined image and a developed image in a case where a construction formed of a plurality of planes is divisionally imaged.

In order to achieve the object, an image processing apparatus according to a first aspect of the present invention comprises an image acquisition unit that acquires a plurality of captured images obtained by respectively imaging different portions of a construction formed of a plurality of planes; a plane specifying unit that specifies common planes common to the plurality of captured images; an image conversion unit that performs projection conversion on images including the common planes among the plurality of captured images, to generate a plurality of converted images in which the common planes are aligned with each other; a combined image generation unit that generates a plane combined image in which the plurality of converted images are combined with each other on an identical plane; and a developed image generation unit that generates a developed image of the construction by connecting a plurality of the plane combined images to each other.

In the image processing apparatus according to the first aspect, common planes common to a plurality of captured images are specified, a plurality of converted images in which the common planes are aligned with each other are generated, and the plurality of converted images are combined with each other on an identical plane. Therefore, even in a case where a construction formed of a plurality of planes are divisionally imaged, a combined image (plane combined image) can be easily generated based on specified common planes, and a developed image of the construction can be easily generated based on the plane combined image.

In the first aspect, an imaging device may be provided in the image acquisition unit such that an image is acquired, and an image recorded already may be acquired via a recording medium or a network (in this case, an imaging optical system or the like acquiring an image may not be provided). In the first aspect, in the phrase "respectively imaging different portions of a construction", imaged portions may be completely different from each other, but images may partially overlap each other such that an omission does not occur in a combined image.

In the first aspect, the image processing apparatus according to a second aspect further comprises a feature point designation unit that designates feature points of the construction in a first image and a second image included in the plurality of captured images, and the image conversion unit performs projection conversion on the first image and the second image assuming that first feature points designated in the first image and second feature points designated in the second image are present on the common planes, to generate the plurality of converted images. A plurality of divisionally captured images have different viewpoints and are thus generally difficult to combine with each other, but feature points are designated such that clues of directing images in an identical direction are obtained, and thus projection conversion can be easily performed. In the second aspect, feature points may be automatically designated by the image processing apparatus, and may be designated based on input of an instruction from a user.

In the second aspect, in the image processing apparatus according to a third aspect, the image conversion unit forms a rectangular shape at each of the first feature points and the second feature points through projection conversion of the first image and the second image, and thus aligns the common planes with each other. In the third aspect, for example, points at which a rectangular shape is known to be formed, for example, four corners of a coffer or a floor slab are designated as feature points, a rectangular shape is formed at the designated feature points, and thus common planes can be easily aligned with each other.

In the second or third aspect, in the image processing apparatus according to a fourth aspect, the feature point designation unit designates the first feature points and the second feature points based on a user operation using a display screen. According to the fourth aspect, a user can easily designate the first and second feature points.

In any one of the first to fourth aspects, in the image processing apparatus according to a fifth aspect, the image conversion unit forms a rectangular shape having designated vertical dimension and horizontal dimension in the images including the common planes, and thus aligns the common planes with each other. As in the fifth aspect, a rectangular shape having designated vertical dimension and horizontal dimension is formed, and thus an aspect ratio of an image can be maintained. In this case, the vertical dimension and the horizontal dimension may be automatically input based on design data or a CAD drawing, and may be input by a user based on the data.

In the first aspect, in the image processing apparatus according to a sixth aspect, the plane specifying unit comprises an image connection unit that generates a connected image by connecting the plurality of captured images to each other, and the image conversion unit performs projection conversion on the plurality of captured images assuming that third feature points designated in the connected image are present on the common plane, to generate the plurality of converted images. In the sixth aspect, the third feature points are designated in a connected image generated by connecting a plurality of captured images to each other, and thus it is possible to save time and effort to designate feature points without needing to designate feature points in each of the plurality of captured images before being connected.

In any one of the first to sixth aspects, in the image processing apparatus according to a seventh aspect, the image acquisition unit acquires a plurality of stereo images as the plurality of captured images, and the plane specifying unit specifies the common planes based on the plurality of stereo images. In the seventh aspect, since a plurality of stereo images are acquired as a plurality of captured images, a plane can be specified for each of the plurality of stereo images, and thus common planes can be easily specified from the plurality of specified planes.

In any one of the first to seventh aspects, the image processing apparatus according to an eighth aspect further comprises a damage mapping unit that maps a measurement result of damage to the construction onto at least one of the plane combined image or the developed image. According to the eighth aspect, a damage measurement result is mapped onto at least one of a plane combined image or a developed image, and thus it is possible to easily understand a state of damage to a construction.

In the eighth aspect, the image processing apparatus according to a ninth aspect further includes an information input unit that inputs information regarding the damage based on a user operation using a display screen. According to the ninth aspect, a user can input desired information regarding damage.

In order to achieve the object, an image processing method according to a tenth aspect of the present invention comprises an image acquisition step of acquiring a plurality of captured images obtained by respectively imaging different portions of a construction formed of a plurality of planes; a plane specifying step of specifying common planes common to the plurality of captured images; an image conversion step of performing projection conversion on images including the common planes among the plurality of captured images, to generate a plurality of converted images in which the common planes are aligned with each other; a combined image generation step of generating a plane combined image in which the plurality of converted images are combined with each other on an identical plane; and a developed image generation step of generating a developed image by connecting a plurality of the plane combined images to each other. According to the tenth aspect, in the same manner as in the first aspect, in a case where a construction formed of a plurality of planes are divisionally imaged, a combined image and a developed image can be easily obtained.

As described above, the image processing apparatus and the image processing method according to the aspects of the present invention enable a combined image and a developed image to be easily obtained in a case where a construction formed of a plurality of planes is divisionally imaged.

BRIEF DESCRIPTION OF THE DRAWINGS

FIGS. 10A and 10B are diagrams illustrating a scene in which common planes are combined and extracted.

FIGS. 11A and 11B are diagrams illustrating a scene in which combined images are connected to each other such that a developed image is generated.

FIG. 13 is a diagram illustrating an example of damage information.

DESCRIPTION OF THE PREFERRED EMBODIMENTS

Hereinafter, with reference to the accompanying drawings, an image processing apparatus and an image processing method according to embodiments of the present invention will be described in detail.

First Embodiment

<Structure of Bridge>

Figure 1:
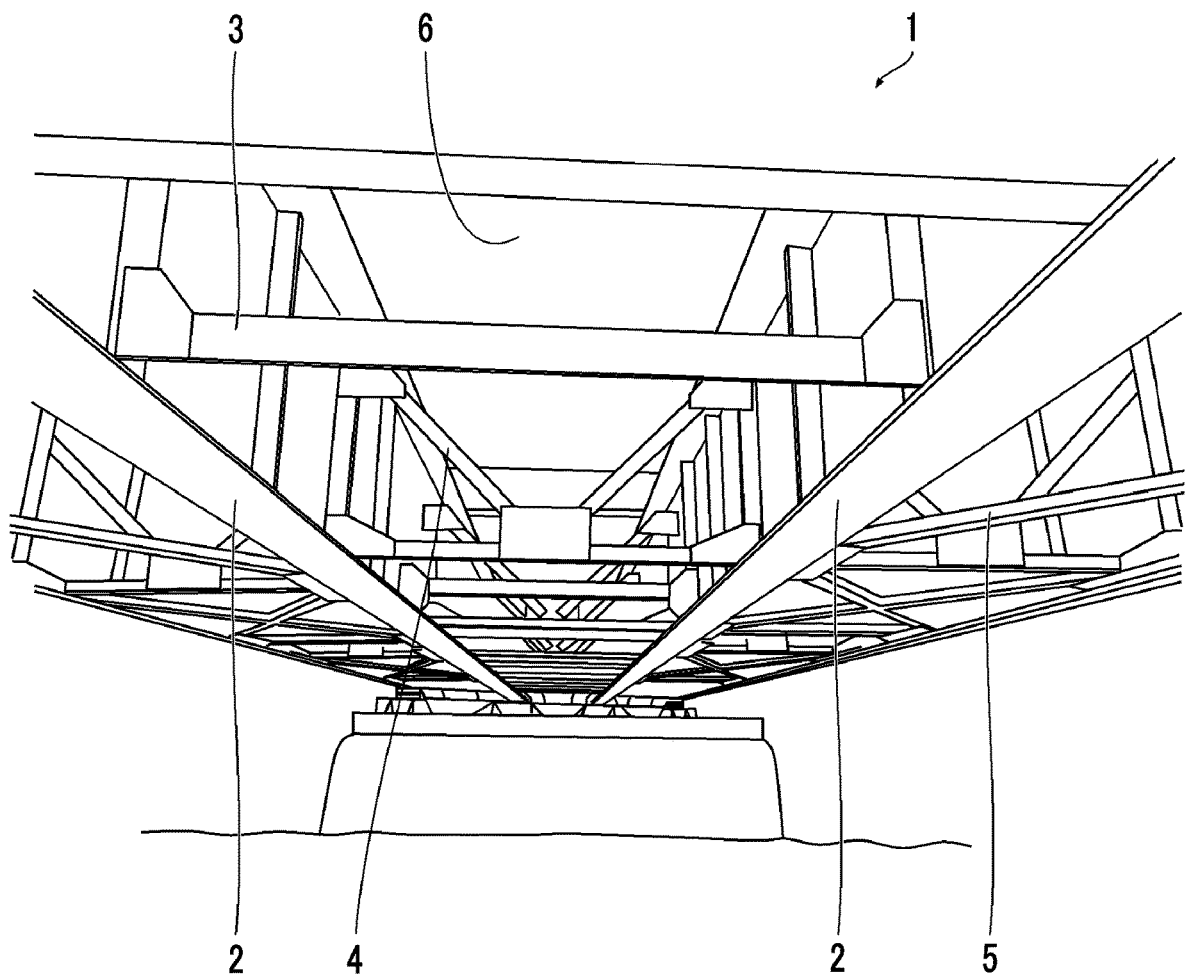
FIG. 1 is an exterior view of a bridge viewed from a lower surface side.

FIG. 1 is a perspective view illustrating a state in which a bridge 1 as an example of a construction is viewed from the below. The bridge 1 illustrated in FIG. 1 has a three-dimensional structure including main girders 2, cross beams 3, sway bracings 4, lateral bracings 5, and a floor slab 6, and these members are connected to each other via bolts, rivets, and welding. The floor slab 6 on which vehicles and the like travel is placed over the main girders 2 and the like. The floor slab 6 is generally made of reinforced concrete. Each of the main girders 2 extends between abutments or bridge piers, and is a member supporting loads of vehicles and the like on the floor slab 6, and has a surface (a surface in a vertical direction) orthogonal to a surface (horizontal surface) of the floor slab 6. The cross beams 3 are members connecting the main girders 2 to each other so as to support loads at the plurality of main girders 2. The sway bracings 4 and the lateral bracings 5 are members connecting the main girders 2 to each other so as to resist lateral loads due to winds and earthquakes, respectively.

<Acquisition of Image>

In a case where a plane combined image and/or a developed image of the bridge 1 are (is) generated, an inspector images the bridge 1 from the below by using a digital camera 100 (refer to FIG. 2), and divisionally acquires a plurality of captured images (a plurality of captured images of different portions of the bridge 1) for an inspection range. The imaging is performed while the inspector is moving as appropriate in an extension direction of the bridge 1 and a direction orthogonal thereto. In a case where it is difficult for the inspector to move due to peripheral situations of the bridge 1, the digital camera 100 may be installed on a moving object that is movable along the bridge 1, and the imaging may be performed. A lifting mechanism or a rotation mechanism (a mechanism performing panning and/or tilting) for the digital camera 100 may be provided on the moving object. An example of the moving object may include a vehicle, a robot, or a drone, but is not limited thereto.

<Configuration of Image Processing System>

Figure 2:
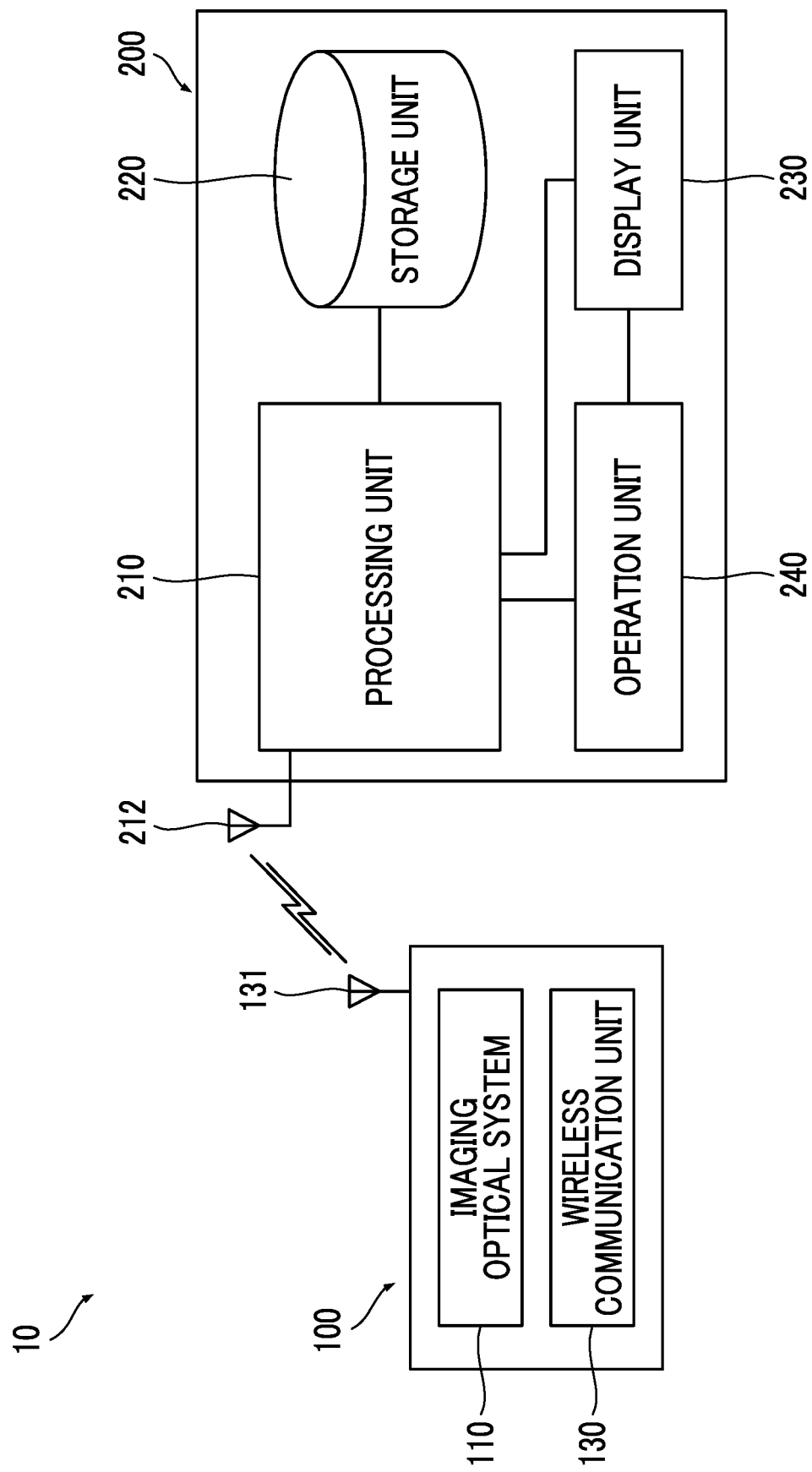
FIG. 2 is a block diagram illustrating a configuration of an image processing system according to a first embodiment.

FIG. 2 is a block diagram illustrating a schematic configuration of an image processing system 10 (image processing apparatus) according to the first embodiment. The image processing system 10 comprises the digital camera 100 (image acquisition unit) and a system main body 200. The digital camera 100 acquires an image with an imaging optical system 110, and performs communication with the system main body 200 via a wireless communication unit 130 and an antenna 131. The system main body 200 comprises a processing unit 210 (an image processing apparatus, an image acquisition unit, a plane specifying unit, an image conversion unit, a combined image generation unit, an developed image generation unit, a feature point designation unit, an image connection unit, or an information input unit), a storage unit 220, a display unit 230, and an operation unit 240 (a feature point designation unit or an information input unit), and the constituent elements are coupled to each other such that necessary information is transmitted and received. The system main body 200 performs wireless communication with the digital camera 100 via an antenna 212. The digital camera 100 may be incorporated into a casing that is different from a casing into which the system main body 200 is incorporated, and may be integrally provided therewith. In a case where a captured image is acquired via a recording medium or a network, the digital camera 100 may not be provided on the image processing system 10.

A function (refer to FIG. 3 with respect to functions of the processing unit 210) of each unit of the system main body 200 may be realized by using various processors. The various processors include, for example, a central processing unit (CPU) that is a general purpose processor realizing various functions by executing software (program). The various processors also include a programmable logic device (PLD) that is a processor of which a circuit configuration is changeable after being manufactured, such as a field programmable gate array (FPGA). The various processors also include a dedicated electric circuit that is a processor having a circuit configuration specially designed in order to execute specific processing, such as an application specific integrated circuit (ASIC).

The function of each unit may be realized by a single processor, and may be realized by a combination of a plurality of processors. A plurality of functions may be realized by a single processor. As an example in which a plurality of functions are realized by a single processor, first, there is a form in which, as typified by a computer such as a client or a server, a combination of one or more CPUs and software configures a single processor, and the process realizes a plurality of functions. Second, as typified by a System On Chip (SoC), there is a form of using a processor realizing functions of the entire system with a single an integrated circuit (IC) chip. As mentioned above, the various functions are realized by using one or more of the various processors as hardware structures. In order to operate such a processor, computer readable codes of a program causing an image processing apparatus to execute an image processing method according to an embodiment of the present invention are recorded on a non-transitory recording medium such as a read only memory (ROM) (not illustrated).

The processing unit 210 includes the antenna 212 for wireless communication and an input/output interface circuit (not illustrated), and the storage unit 220 is configured to include a non-transitory recording medium such as a hard disk drive (HDD). The display unit 230 includes a display device such as a liquid crystal display, and the operation unit 240 includes an input device such as a keyboard or a mouse. Such a configuration is an example of a configuration of an image processing apparatus according to an embodiment of the present invention, and other configurations may be employed as appropriate.

As described above, an image captured by using the digital camera 100 is input to the processing unit 210 through wireless communication, and is subjected to image processing which will be described later. The digital camera 100 comprises the imaging optical system 110, and the imaging optical system 110 comprises an imaging lens and an imaging element (not illustrated). An example of the imaging element may include a charge coupled device (CCD) type imaging element or a complementary metal-oxide semiconductor (CMOS) type imaging element. A light receiving surface of the imaging element is provided with a color filter of red (R), green (G), and blue (B), and a color image of a subject may be acquired based on each color signal.

<Configuration of Processing Unit>

Figure 3:
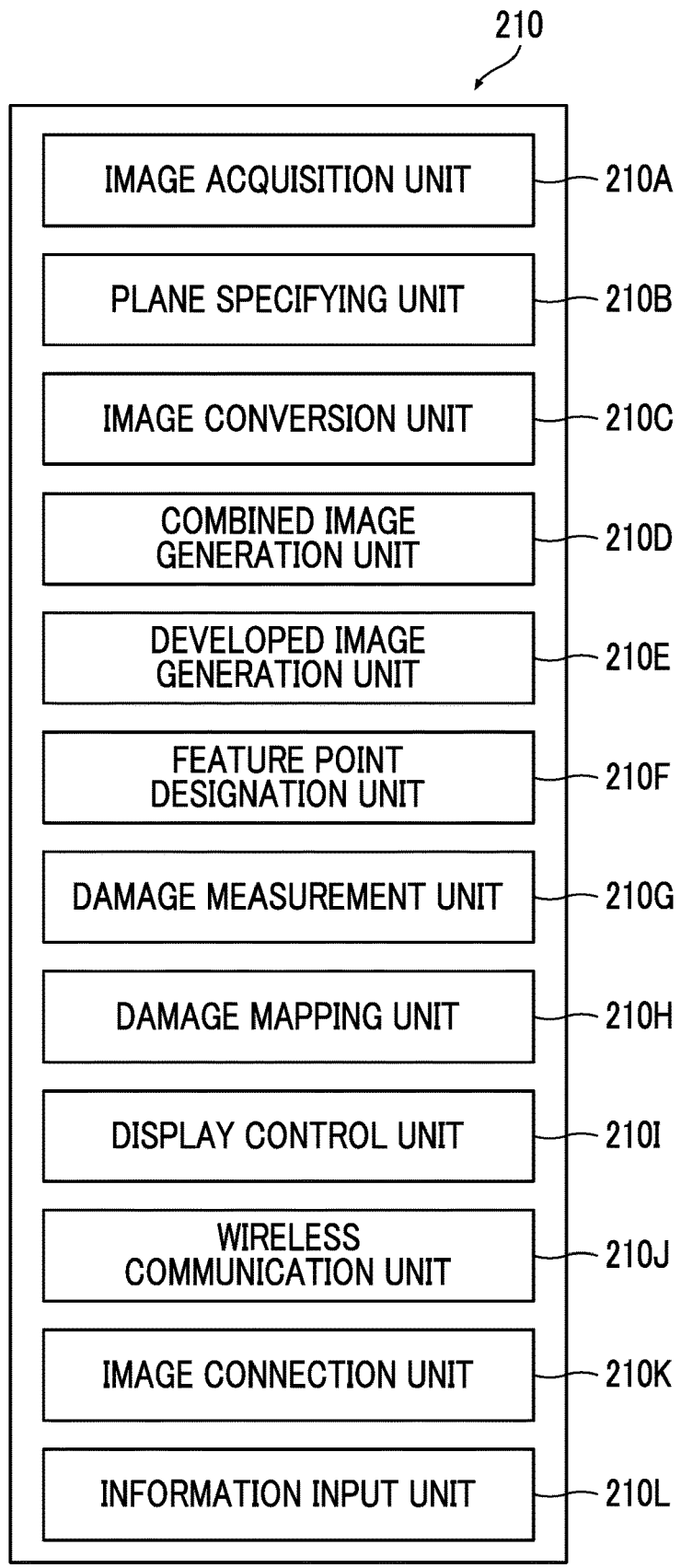
FIG. 3 is a diagram illustrating a functional configuration of a processing unit.

FIG. 3 is a diagram illustrating a functional configuration of the processing unit 210. The processing unit 210 comprises an image acquisition unit 210A, a plane specifying unit 210B, an image conversion unit 210C, a combined image generation unit 210D, a developed image generation unit 210E, a feature point designation unit 210F, a damage measurement unit 210G, a damage mapping unit 210H, a display control unit 210I, a wireless communication unit 210J, an image connection unit 210K, and an information input unit 210L. A function (each process in an image processing method) of each unit is realized by various processors (electronic circuits) such as a central processing unit (CPU) executing images and information stored in the storage unit 220, and an image processing program stored on a ROM (non-transitory recording medium). The image processing program is stored as computer readable codes as described above. In FIG. 3, devices such as a CPU, a ROM, and a RAM are not illustrated.

The image acquisition unit 210A acquires captured images of the bridge 1 (a plurality of captured images of different portions of the bridge 1) from the digital camera 100 (or a recording medium or a network). The digital camera 100 and the image acquisition unit 210A configure an image acquisition unit in the image processing system 10. The plane specifying unit 210B specifies planes (common plane) common to the plurality of captured images. The image conversion unit 210C performs projection conversion on images including the common plane among the captured images, and thus generates converted images in which the common planes are aligned with each other. The combined image generation unit 210D generates a plane combined image in which the converted images are combined with each other on an identical plane. The developed image generation unit 210E connects a plurality of plane combined images to each other so as to generate a developed image of a construction. The feature point designation unit 210F designates a feature point of the construction in the captured image. The damage measurement unit 210G measures damage (a crack, peeling, or corrosion) in the captured image, the plane combined image, and the developed image. The damage mapping unit 210H maps information indicating damage onto at least one of the plane combined images or the developed image. The display control unit 210I performs display control of the captured image, the plane combined image, or the developed image on the display unit 230. The wireless communication unit 210J transmits and receives an image and information to and from the digital camera 100 via the antenna 212. The image connection unit 210K connects divisionally captured images to each other. The information input unit 210L inputs damage information into the plane combined image or the developed image.

<Configuration of Storage Unit>

Figure 4:
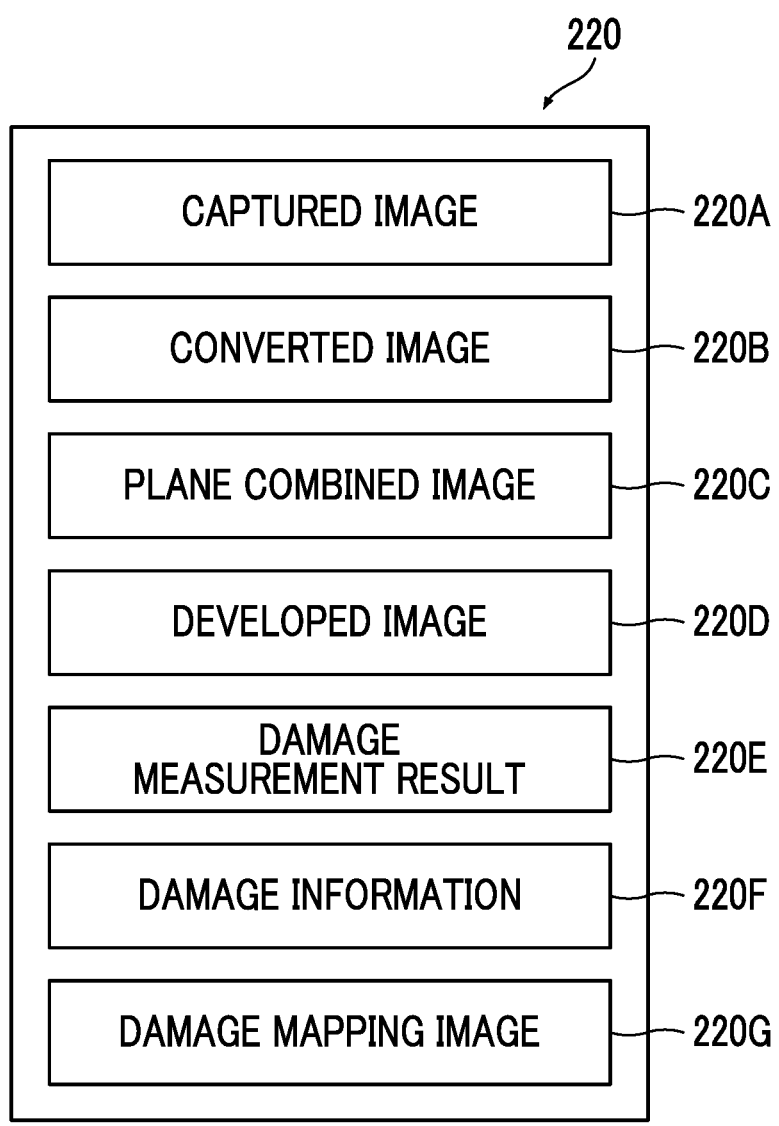
FIG. 4 is a diagram illustrating information stored in a storage unit.

The storage unit 220 is configured with a non-transitory recording medium such as a compact disk (CD), a digital versatile disk (DVD), a hard disk, or various semiconductor memories, and a controller thereof, and stores images and information illustrated in FIG. 4 to be associated with each other. Captured images 220A are a plurality of captured images that are acquired by the image acquisition unit 210A as a result of the digital camera 100 imaging the bridge 1 (for example, the floor slab 6 and the main girders 2). Images acquired via a network or a recording medium may be stored instead of images that are input from the digital camera 100 and the image acquisition unit 210A. Converted images 220B are converted images in which common planes are aligned with each other. A plane combined image 220C is an image in which converted images are combined with each other on an identical plane. A developed image 220D is an image generated by connecting a plurality of plane combined images to each other and indicates the entire imaging range. A damage measurement result 220E is information indicating a measurement result of damage in a captured image, a plane combined image, and a developed image. Damage information 220F is information that is input by a user with respect to damage. A damage mapping image 220G is an image in which information indicating damage is mapped onto a plane combined image and/or a developed image.

<Configuration of Display Unit and Operation Unit>

The display unit 230 is provided with a display device (not illustrated) such as a liquid crystal display, and displays an input image, an image and information stored in the storage unit 220, and a result of a process performed by the processing unit 210. The operation unit 240 (a feature point designation unit or an information input unit) includes input devices (not illustrated) such as a mouse as a pointing device and a keyboard, and a user may perform an operation such as designation of a feature point or input of damage information via the operation unit 240 and a screen (display screen) of the display device.

Procedure of Image Processing (Example 1)

Figure 5:
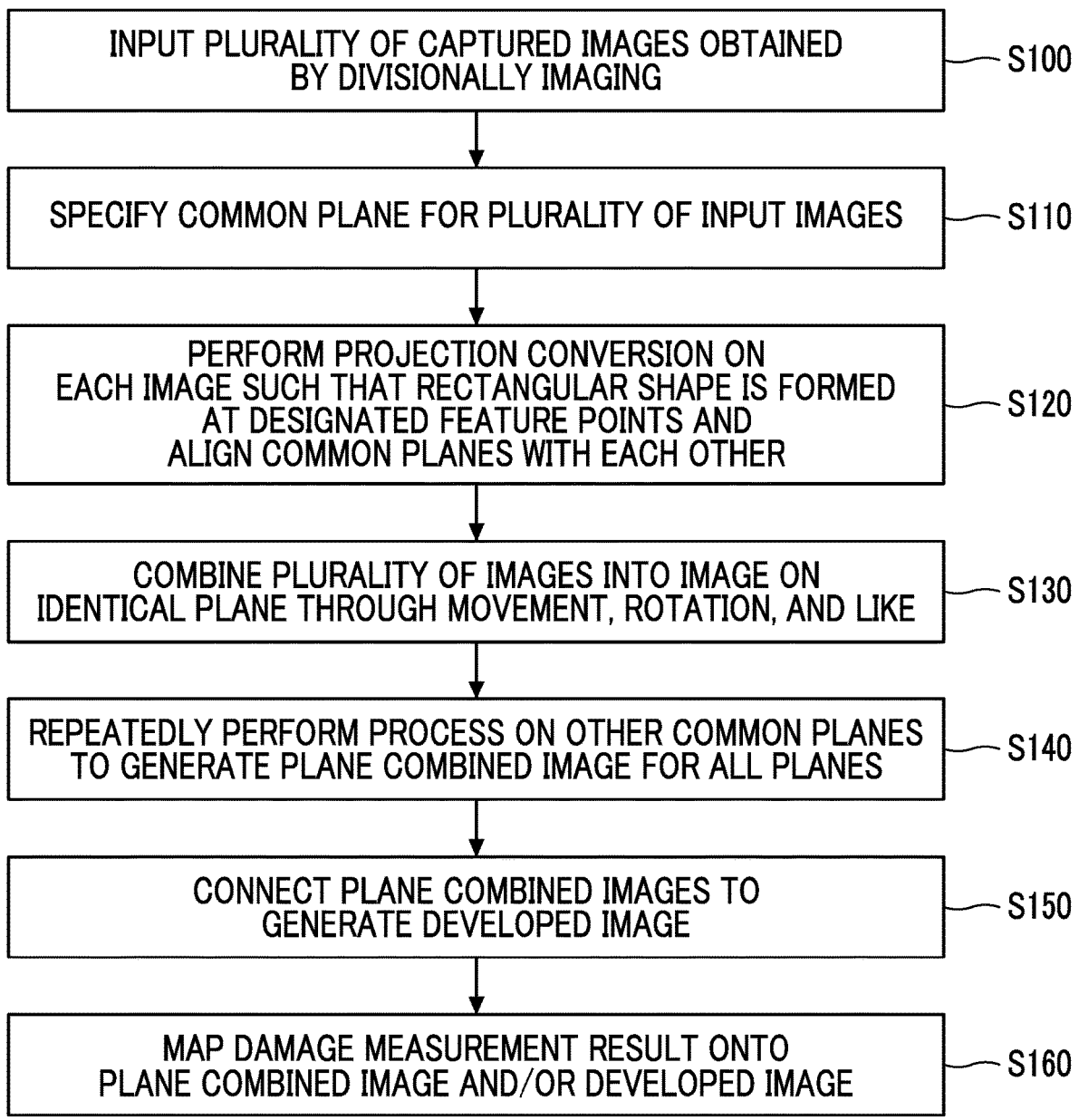
FIG. 5 is a flowchart illustrating image processing according to the first embodiment (example 1).

A description will be made of image processing (example 1) performed by the image processing system 10. FIG. 5 is a flowchart illustrating each process in an image processing method related to (example 1).

<Image Acquisition>

Figure 6:
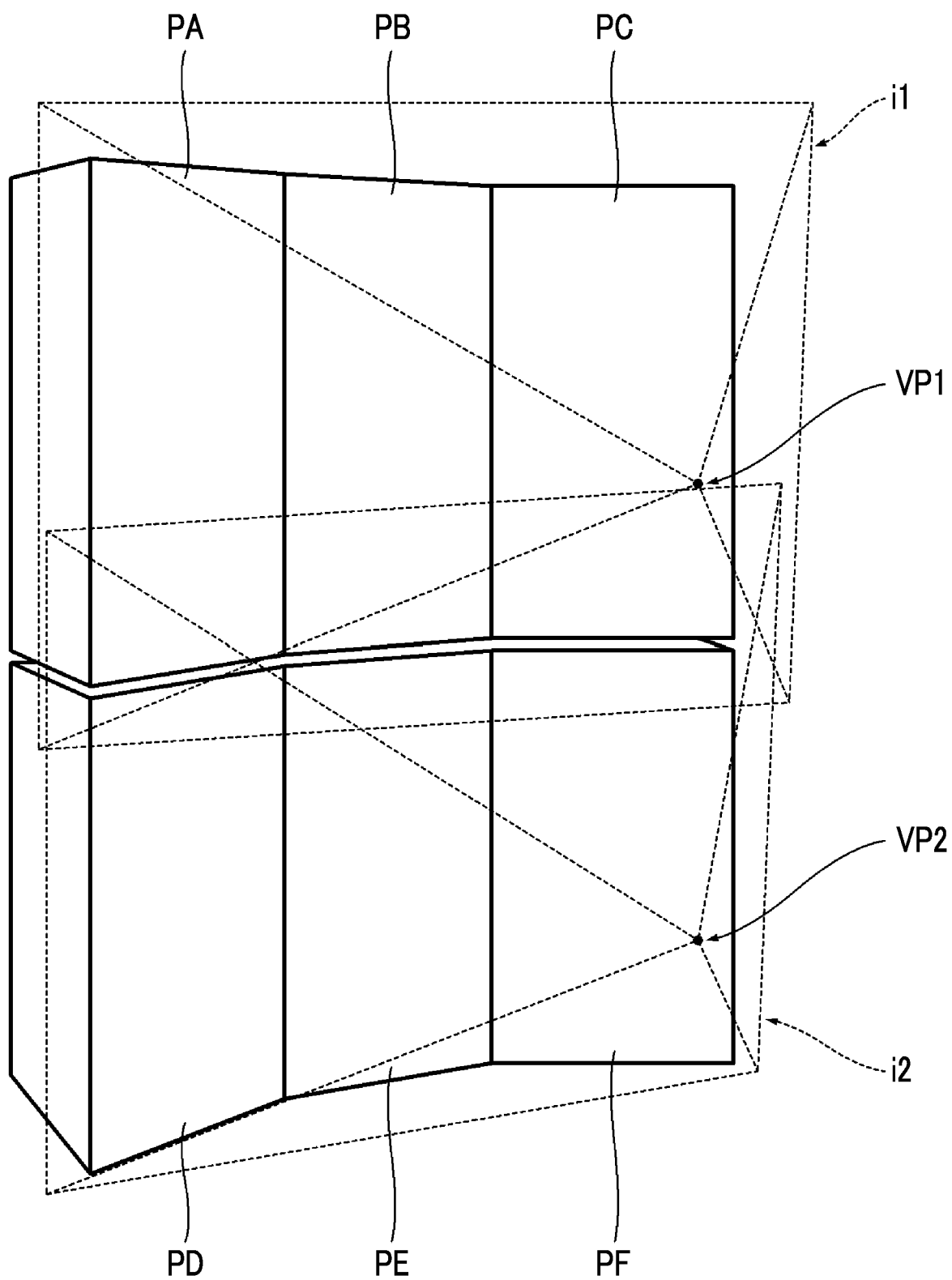
FIG. 6 is a diagram illustrating a scene in which a construction is divisionally imaged.

First, a plurality of captured images obtained by divisionally imaging different portions of the bridge 1 (construction) in the digital camera 100 are acquired (step S100, image acquisition step). The system main body 200 acquires the plurality of captured images via the digital camera 100 (the wireless communication unit 130, the antenna 131, and the antenna 212) and the processing unit 210 (the wireless communication unit 210J and the image acquisition unit 210A). For example, as illustrated in FIG. 6, an image i1 (first image) captured from a viewpoint VP1 and an image i2 (second image) captured from a viewpoint VP2 are acquired. FIG. 6 schematically illustrates a scene in which the bridge 1 is formed of a plurality of planes (the floor slab 6 and the left and right main girders 2). The different portions of the bridge 1 are included in the plurality of images, but imaging ranges may partially overlap each other instead of being completely different from each other. The processing unit 210 (display control unit 210I) displays the acquired images i1 and i2 on the display device of the display unit 230. Hereinafter, a description will be made assuming that a surface PA and a surface PD (surfaces of the main girder 2), a surface PB and a surface PE (surfaces of the floor slab 6), and a surface PC and a surface PF (surfaces of the main girder 2) are present on an identical plane.

<Specifying of Common Plane>

Since the images i1 and i2 have the different viewpoints, even surfaces (for example, the surface PA and the surface PD) that originally belong to an identical plane have different orientations, and are thus difficult to combine with each other on the identical plane without being changed. Therefore, in the first embodiment, a user designates feature points for each image, and specifies a common plane based on the designated feature points (step S110; plane specifying step).

<Designation of Feature Point>

Figure 7A:
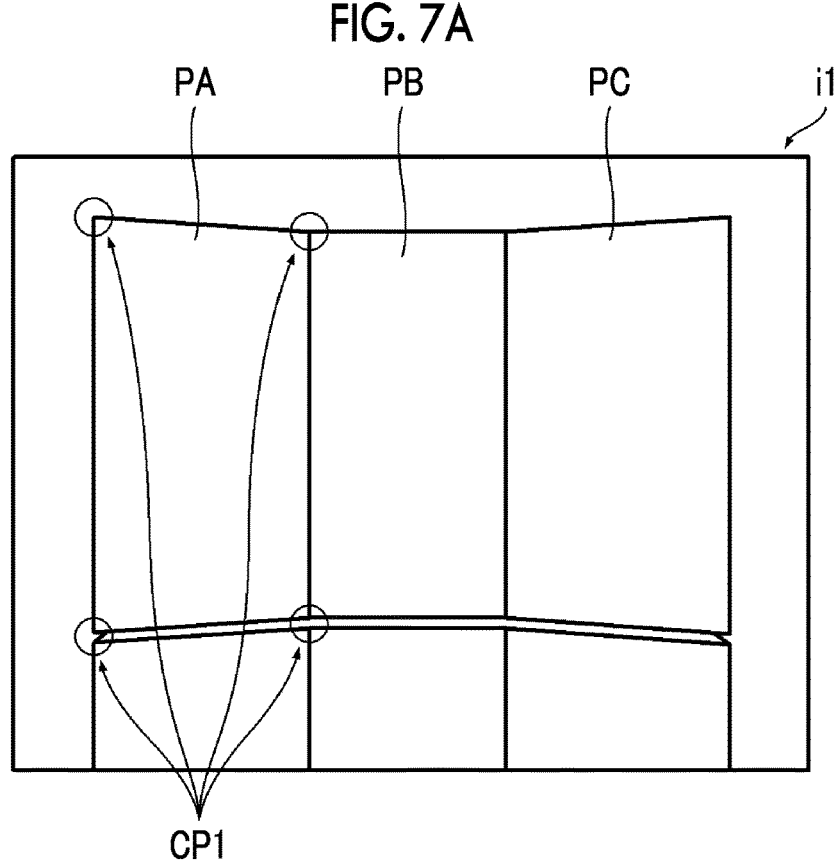
FIGS. 7A and 7B are diagrams illustrating a scene in which feature points are designated in each image.
Figure 7B:
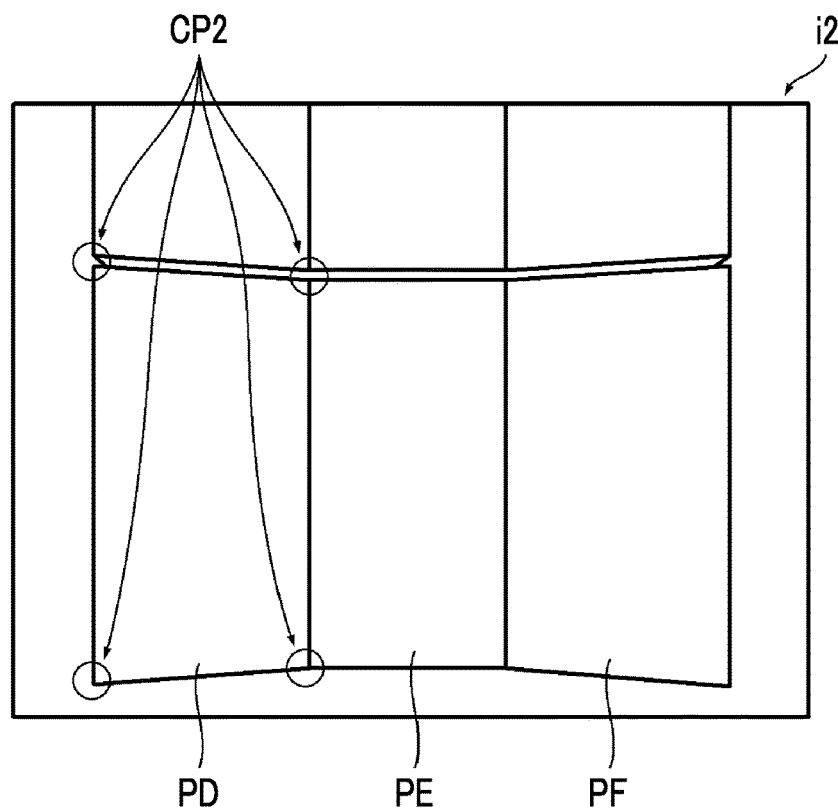

The user indicates feature points (for example, clicks the feature points with the mouse (not illustrated) of the operation unit 240) in the images i1 and i2 (a first image and a second image) displayed on the display screen of the display unit 230, and the processing unit 210 (feature point designation unit 210F) designates the designated points as feature points. For example, as illustrated in FIG. 7A, in a case where the user designates four corners (vertexes) of the surface PA in the image i1 as feature points CP1 (first feature points), the processing unit 210 (the feature point designation unit 210F or the plane specifying unit 210B) determines that "the four feature points CP1 are present on an identical plane". As illustrated in FIG. 7B, in a case where the user designates four corners (vertexes) of the surface PD in the image i2 as feature points CP2 (second feature points), the processing unit 210 (the feature point designation unit 210F or the plane specifying unit 210B) determines that "the four feature points CP2 are present on an identical plane". The processing unit 210 (plane specifying unit 210B) determines that "the plane on which the feature points CP1 are present and the plane on which the feature points CP2 are present are common planes", and specifies common planes. Four points are designated as feature points as described above, and thus a rectangular shape can be specified during image conversion which will be described later.

<Image Conversion>

Figure 8A:
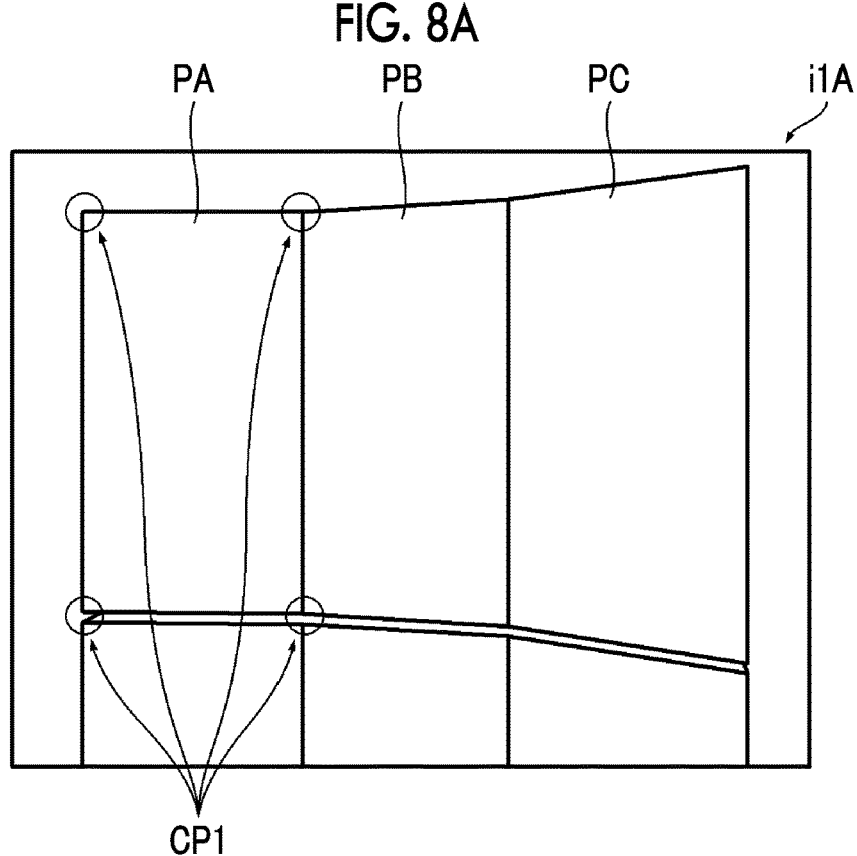
FIGS. 8A and 8B are diagrams illustrating a scene in which a rectangular shape is formed at designated feature points through projection conversion of each image.
Figure 8B:
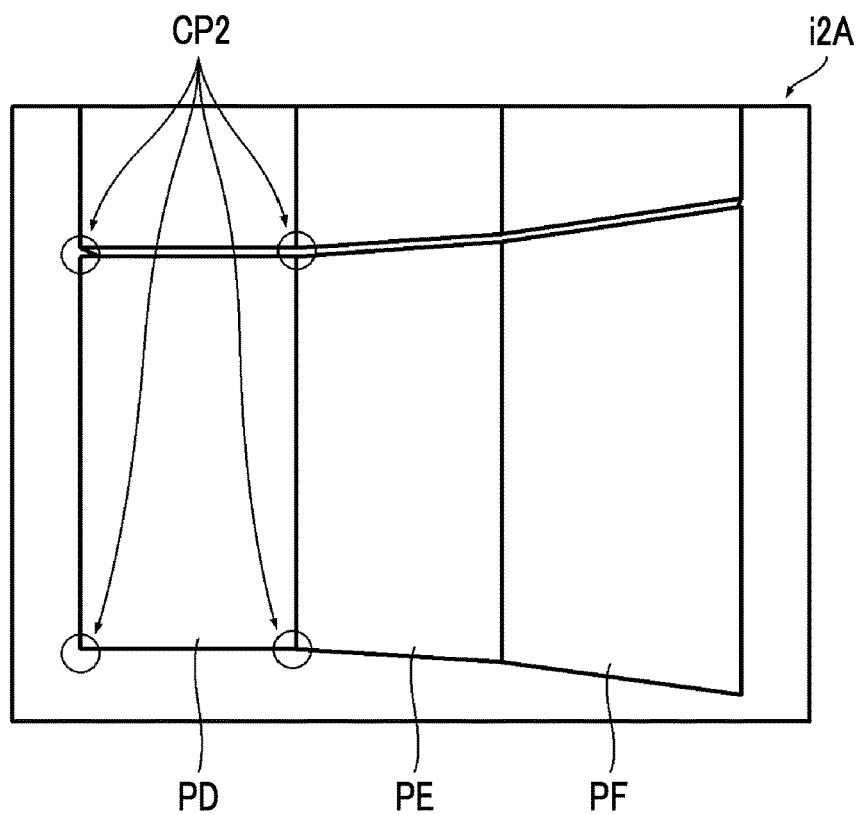

In a case where the common planes are specified in step S110, the processing unit 210 (image conversion unit 210C) performs projection conversion on the images i1 and i2, so as to respectively form rectangular shapes at the four feature points CP1 and CP2, and generates a plurality of converted images in which the common planes are aligned with each other (step S120; image conversion step). For example, as illustrated in FIG. 8A, the processing unit 210 (image conversion unit 210C) performs projection conversion on the image i1 (first image), and thus generates a converted image i1A in which the feature points CP1 (first feature points) form a rectangular shape. As illustrated in FIG. 8B, the processing unit 210 (image conversion unit 210C) performs projection conversion on the image i2 (second image), and thus generates a converted image i2A in which the feature points CP2 (second feature points) form a rectangular shape.

Figure 9A:
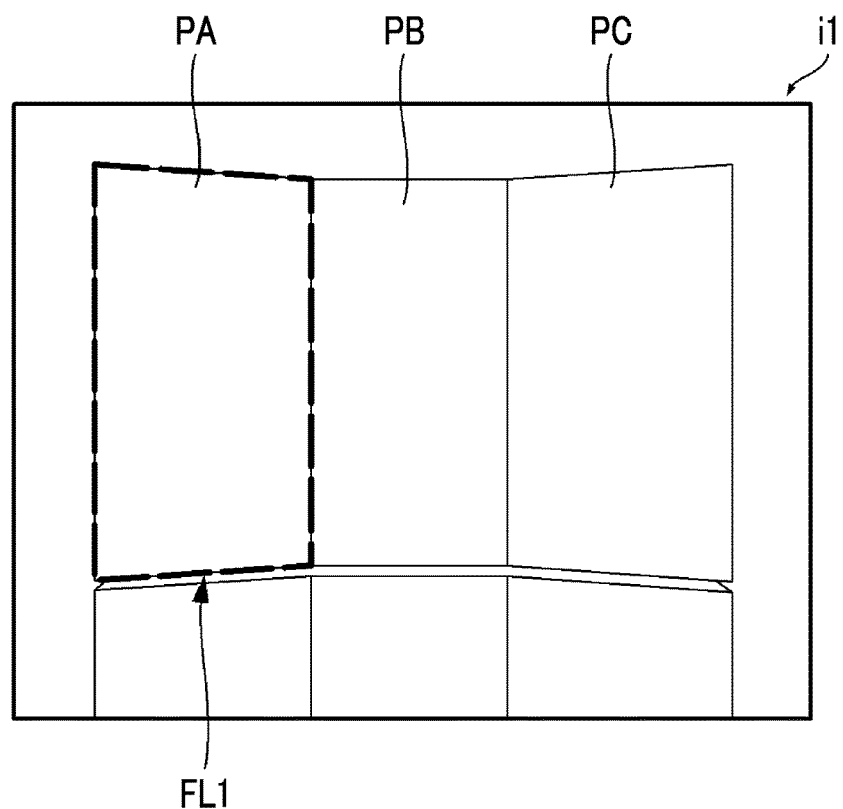
FIGS. 9A and 9B are diagrams illustrating a scene in which a frame is designated.
Figure 9B:
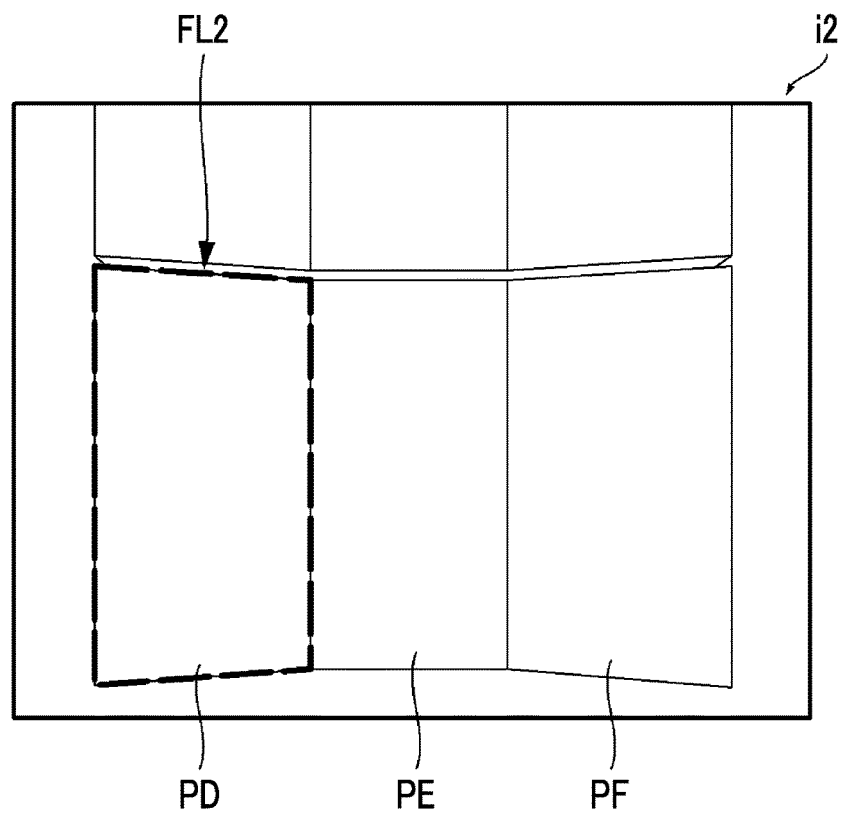

In FIGS. 7 and 8, a description has been made of a case where four feature points are designated for each surface, but, as illustrated in an (a) part and FIG. 9B, a quadrangular frame FL1 may be set in the surface PA, a quadrangular frame FL2 may be set in the surface PD, and rectangular shapes may be formed at the frames FL1 and FL2 through projection conversion.

In the image conversion, a rectangular shape having designated vertical dimension and horizontal dimension may be formed such that common planes are aligned with each other, and an aspect ratio of an image can be maintained through the conversion. In this case, the vertical dimension and the horizontal dimension may be automatically input based on design data or a CAD drawing, and may be input by a user based on the data.

<Converted Image Generation>

The processing unit 210 (combined image generation unit 210D) combines a plurality of converted images i1A and i2A into an image (single image) on an identical plane (step S130: combined image generation step). For example, the converted images may be combined into an image on an identical plane by matching corresponding feature points with each other through movement, rotation, enlargement, or reduction of the converted images. For example, as illustrated in FIG. 10A, an image i3 in which the surface PA and the surface PD of the converted images i1A and i2A are combined with each other on an identical plane is generated. In this case, since other surfaces (surfaces PB, PC, PE, and PF) of the converted images i1A and i2A are not necessarily present on an identical plane, as illustrated in FIG. 10B, the processing unit 210 (combined image generation unit 210D) extracts a region including the surface PA and the surface PD from the image i3 so as to generate a plane combined image i3A (plane combined image) (step S130: combined image generation step).

<Processing on Other Surfaces>

Since the plane combined image i3A for the surface PA and the surface PD is generated through the processes in step S110 to step S130, the processing unit 210 (the plane specifying unit 210B, the image conversion unit 210C, or the combined image generation unit 210D) repeatedly performs the processes on the other surfaces (surfaces PB, PC, PE, and PF) (step S140; a plane specifying process, an image conversion process, or a combined image generation step). Consequently, as illustrated in FIG. 11A, a plane combined image i3B (a plane combined image generated from the surface PB and the surface PE) and a plane combined image i3C (a plane combined image generated from the surface PC and the surface PF) are generated in addition to the plane combined image i3A.

<Developed Image Generation>

In a case where a plane combined image is generated for each plane, as illustrated in FIG. 11B, the processing unit 210 (developed image generation unit 210E) connects the plane combined images i3A to i3C to each other, so as to generate a developed image i4 (step S150; developed image generation step). In this case, movement, rotation, enlargement, or reduction of images may be performed as necessary in the same manner as in generation of the plane combined image.

As described above, in the image processing system 10 according to the first embodiment, common planes common to a plurality of captured images are specified, a plurality of converted images in which the common planes are aligned with each other are generated, and the plurality of converted images are combined with each other on an identical plane. Therefore, even in a case where the bridge 1 (construction) formed of a plurality of planes (the floor slab 6 and the left and right main girders 2) having greatly different orientations are divisionally imaged, a combined image (plane combined image) can be easily generated based on specified common planes, and a developed image of the construction can be easily generated based on the plane combined image.

<Measurement of Damage>

The processing unit 210 (damage measurement unit 210G) measures damage included in an image (a captured image, a plane combined image, or a developed image) of the bridge 1. For example, designation of representative points (a start point and an end point, a central point, or a point on a contour), a region setting (by surrounding the periphery), tracing (drawing a straight line or a curve), or the like is performed based on an operation using the operation unit 240 and the display device (display screen) of the display unit 230, and a position or a shape of damage is specified. The damage can be measured by calculating a distance between the representative points, an area of the region, or a length of a traced line segment based on a specified result. Measurement of damage may be performed on any image (a captured image, a plane combined image, or a developed image), but the measurement is preferably performed by taking into consideration the influence (enlargement, reduction, or deformation of damage) of image processing at the time of generation of the plane combined image and the developed image. A content of measurement may be set according to a position, a length, a width, or an area of damage, the type of damage (a crack, corrosion, peeling), and an inspection purpose. A measurement result is stored in the storage unit 220 (the damage measurement result 220E in FIG. 4), and is displayed on the display unit 230 under the control of the display control unit 210I.

<Mapping of Measurement Result>

Figure 12:
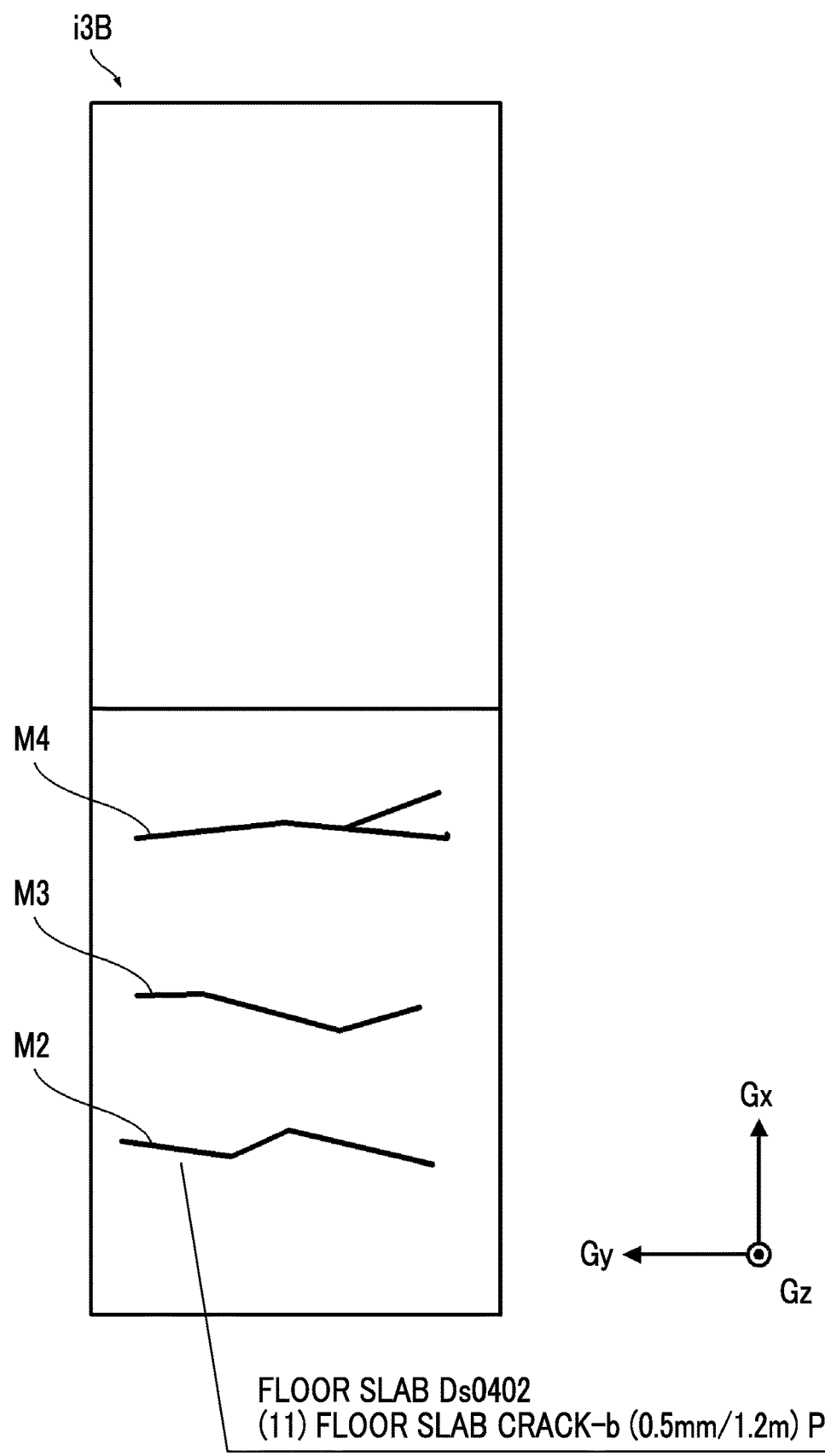
FIG. 12 is a diagram illustrating a scene in which a damage measurement result is mapped onto a plane combination diagram of a floor slab.
Figure 14:
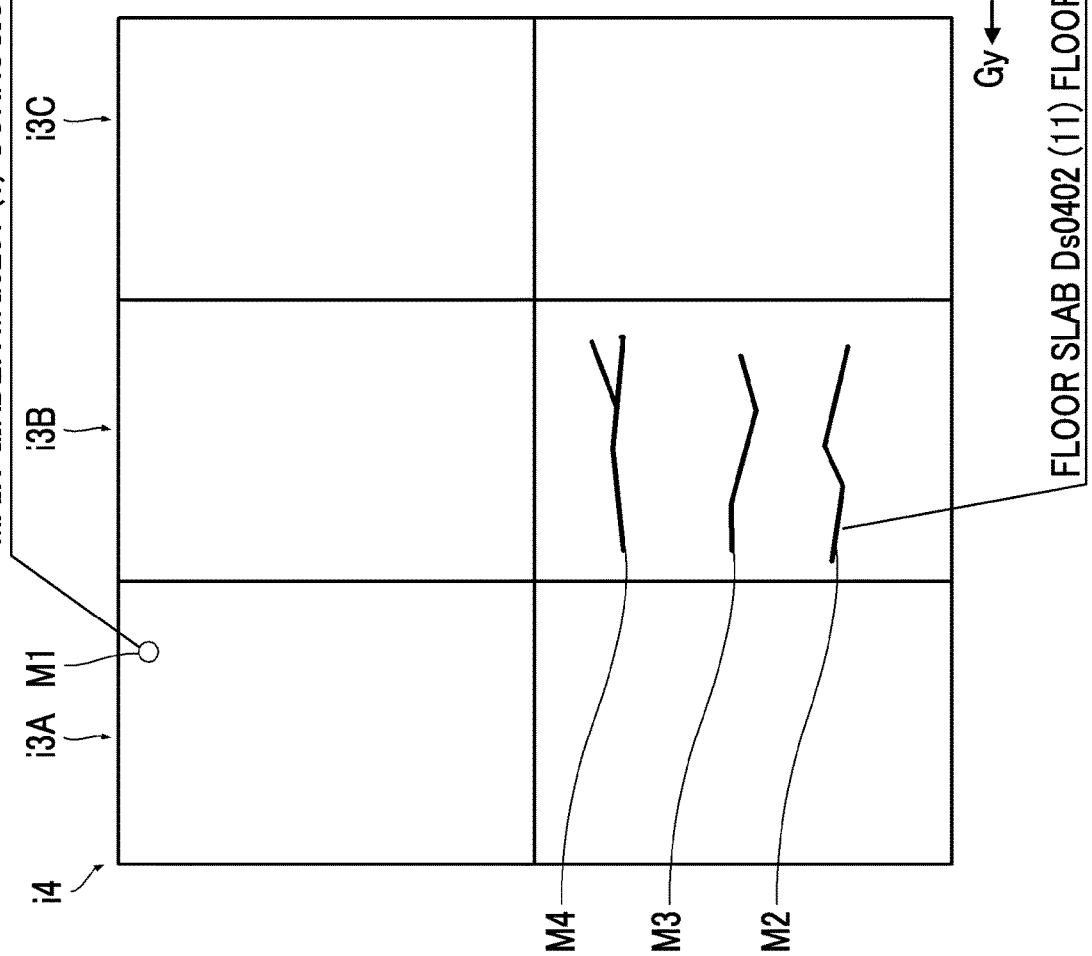
FIG. 14 is a diagram illustrating a scene in which a measurement result is mapped onto a developed image of a bridge, and the damage information is input.

The processing unit 210 (damage mapping unit 210H) maps a damage measurement result onto at least one of a plane combined image or a developed image (step S160: damage mapping step). The mapping may be performed by displaying text, a graphic, or a symbol associated with a measurement result on the plane combined image and/or the developed image. The displayed text, graphic, or symbol may be selected through an operation using the operation unit 240, and the processing unit 210 (display control unit 210I) displays the measurement result on the display unit 230 according to the selection. The text, the graphic, or the symbol may simplify or emphasize actual damage, and may be displayed in different aspects depending on the type or a size of damage. FIG. 12 is a diagram illustrating an example in which a measurement result is mapped onto the plane combined image i3B (a partial plane combined image of the floor slab 6), and graphics M2 to M4 indicating the number, positions, and lengths of cracks are displayed. As illustrated in FIG. 12, the image onto which the measurement result is mapped is stored in the storage unit 220 (the damage mapping image 220G in FIG. 4), and is displayed on the display unit 230 under the control of the display control unit 210I. In FIG. 12 and FIG. 14 which will be described later, a longitudinal direction of the main girder 2 is set to a coordinate axis Gx, a direction orthogonal to the longitudinal direction is set to a coordinate axis Gy, a direction orthogonal to the coordinate axes Gx and Gy is set to a coordinate axis Gz, the coordinate axes (Gx, Gy, and Gz) form a right-handed system.

<Input of Damage Information>

In the image processing system 10, damage information may be input in addition to mapping of a measurement result. The processing unit 210 (information input unit 210L) inputs damage information based on a user's instruction using the display unit 230 and the operation unit 240. FIG. 12 illustrates a scene in which crack information (a member name, the type, a thickness, and a length of damage, and an image number) is input on a leader line portion for the graphics M2 to M4. The input damage information is stored in the storage unit 220, for example, in a format illustrated in FIG. 13 (the damage information 220F in FIG. 4), and is displayed on the display unit 230 under the control of the display control unit 210I. A content and a format of information that is input as the damage information preferably conform to "Bridge Periodic Inspection Procedure (June, 2014)" created in the Ministry of Land, Infrastructure, Transport and Tourism.

The mapping of a measurement result and the input of damage information may be performed on a developed image instead of a plane combined image as illustrated in FIG. 12. FIG. 14 is a diagram illustrating a scene in which mapping of a measurement result and input of damage information are performed on the developed image i4, and a graphic M1 indicating corrosion and damage information thereof are displayed on a portion of the main girder 2 are displayed in addition to the graphics M2 to M4 indicating cracks and the damage information thereof.

<Procedure of Image Processing (Example 2)>

A description will be made of another example of a procedure of image processing. In the example 1 of image processing, surfaces for which feature points are designated are aligned with each other through projection conversion, and then images are combined with each other (a plane combined image is generated), but the example 2 is different from the example 1 in terms of a method of generating a plane combined image, images are combined with each other, a user designates feature points, and planes are aligned with each other by performing projection conversion assuming that the designated feature points are present on an identical plane.

Figure 15:
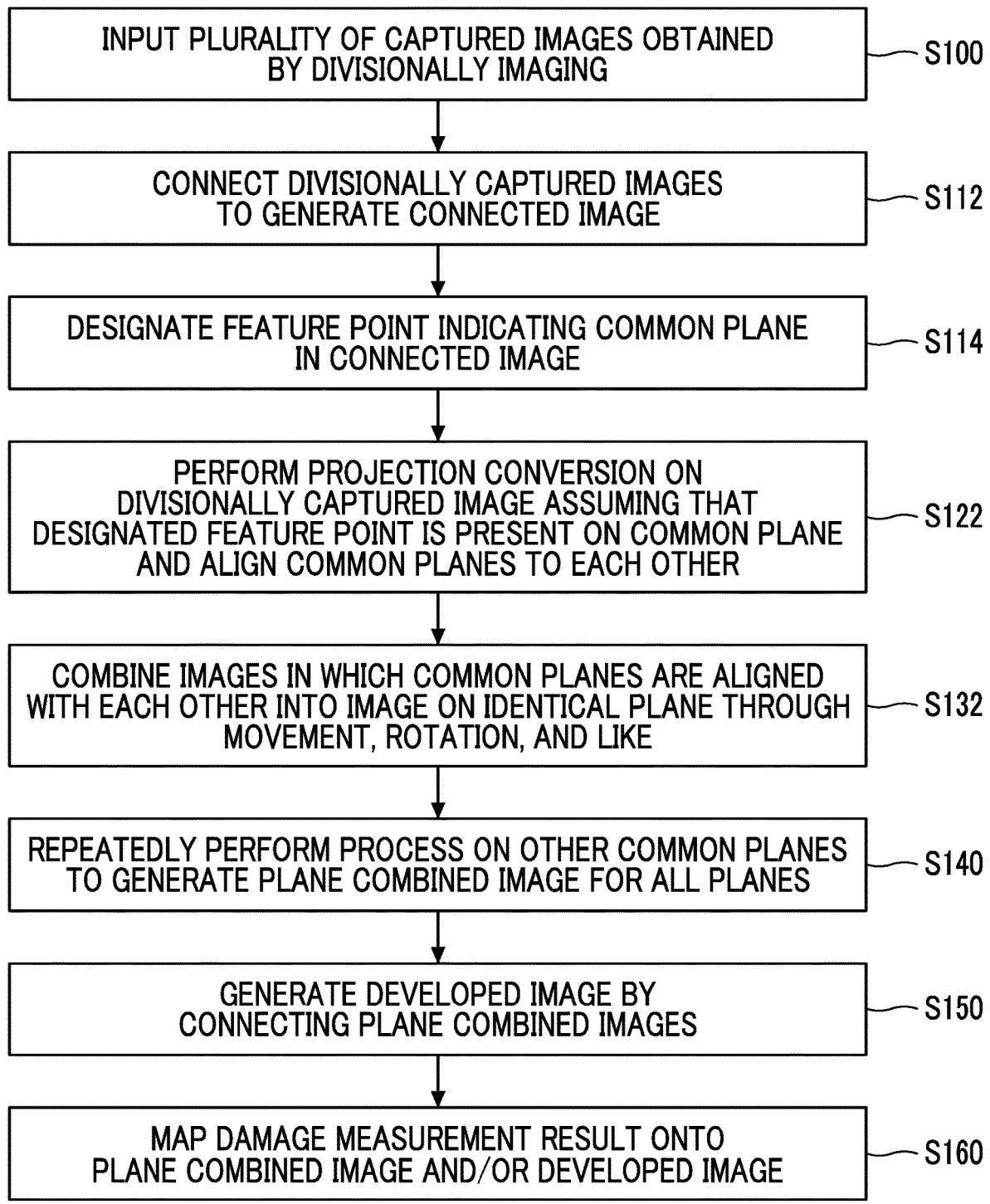
FIG. 15 is a flowchart illustrating image processing according to the first embodiment (example 2).

FIG. 15 is a flowchart illustrating a procedure of image processing related to the example 2. In respective steps illustrated in FIG. 15, an identical step number is given to the same process as that in the example 1 (FIG. 5), and a detailed description thereof will be omitted. The drawings related to the example 1 will be referred to as appropriate.

Figure 16:
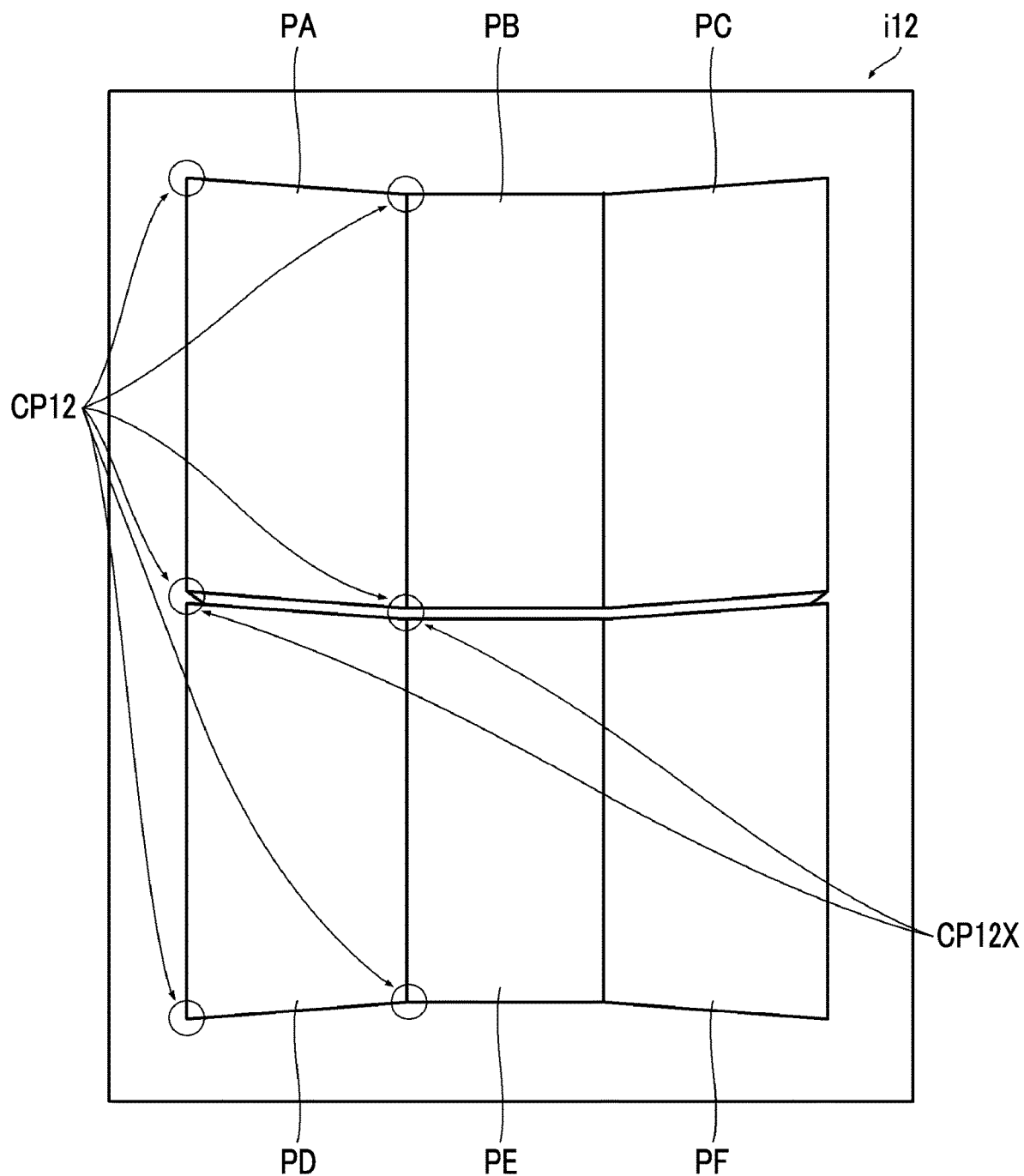
FIG. 16 is a diagram illustrating a scene in which a feature point is designated in an automatically combined image.

In the example 2, in a case where a plurality of divisionally captured images (for example, the images i1 and i2 illustrated in FIG. 6) are input in step S100 (image acquisition step), the processing unit 210 (image connection unit 210K) connects the input images i1 and i2 to each other through movement, rotation, enlargement, or reduction, so as to generate, for example, a combined image i12 as illustrated in FIG. 16 (step S112: connected image generation step). Since, in the combined image i12, the surfaces PA and PD are not aligned with each other, and are not present on an identical plane (common planes are not aligned with each other), six feature points CP12 (third feature points) are designated (step S114: plane specifying step). In the example 1, four feature points are designated for each of the surfaces PA and PD, that is, a total of eight feature points (first and second feature points) are designated, but, in the second example, since the six feature points are designated after image combination, it is possible to save time and effort to designate overlapping feature points (among the feature points CP12, two overlapping feature points CP12x in the surfaces PA and PD).

The processing unit 210 (image conversion unit 210C) determines that "the surfaces PA and PD for which the feature points CP12 are designated are present on an identical plane", performs projection conversion on the combined image i12 such that the surfaces PA and PD are aligned with each other as in the image i3 illustrated in FIG. 10A, and are thus present on an identical plane (step S122: image conversion step). As illustrated in FIG. 10B, the processing unit 210 (image conversion unit 210C) extracts a region including the surface PA and the surface PD from the image i3 so as to generate a plane combined image i3A (plane combined image) (step S132: combined image generation step).

In a case where the plane combined image is generated through the processes up to step S132, the processes are repeatedly performed on other surfaces in the same manner as in the example 1 such that a plurality of plane combined images (refer to FIG. 11A) are generated (step S140: combined image generation step), and a developed image (refer to FIG. 11B) is generated by connecting the plane combined images to each other (step S150: developed image generation step). Mapping of a damage measurement result and input of damage information (step S160: a damage mapping process or a damage information input step) may also be performed in the same manner as in the example 1 (refer to FIGS. 12 to 14).

Also in the example 2, in the same manner as in the example 1, even in a case where the bridge 1 (construction) formed of a plurality of planes (the floor slab 6 and the left and right main girders 2) having greatly different orientations are divisionally imaged, a combined image (plane combined image) can be easily generated based on specified common planes, and a developed image of the construction can be easily generated based on the plane combined image.

Second Embodiment

In the first embodiment, projection conversion is performed on a plurality of images divisionally captured by using a single imaging optical system 110, and thus planes are aligned with each other, but, in the second embodiment, planes are specified by using stereo images acquired by a stereo optical system, and the specified planes are aligned with each other through projection conversion.

Figure 17:
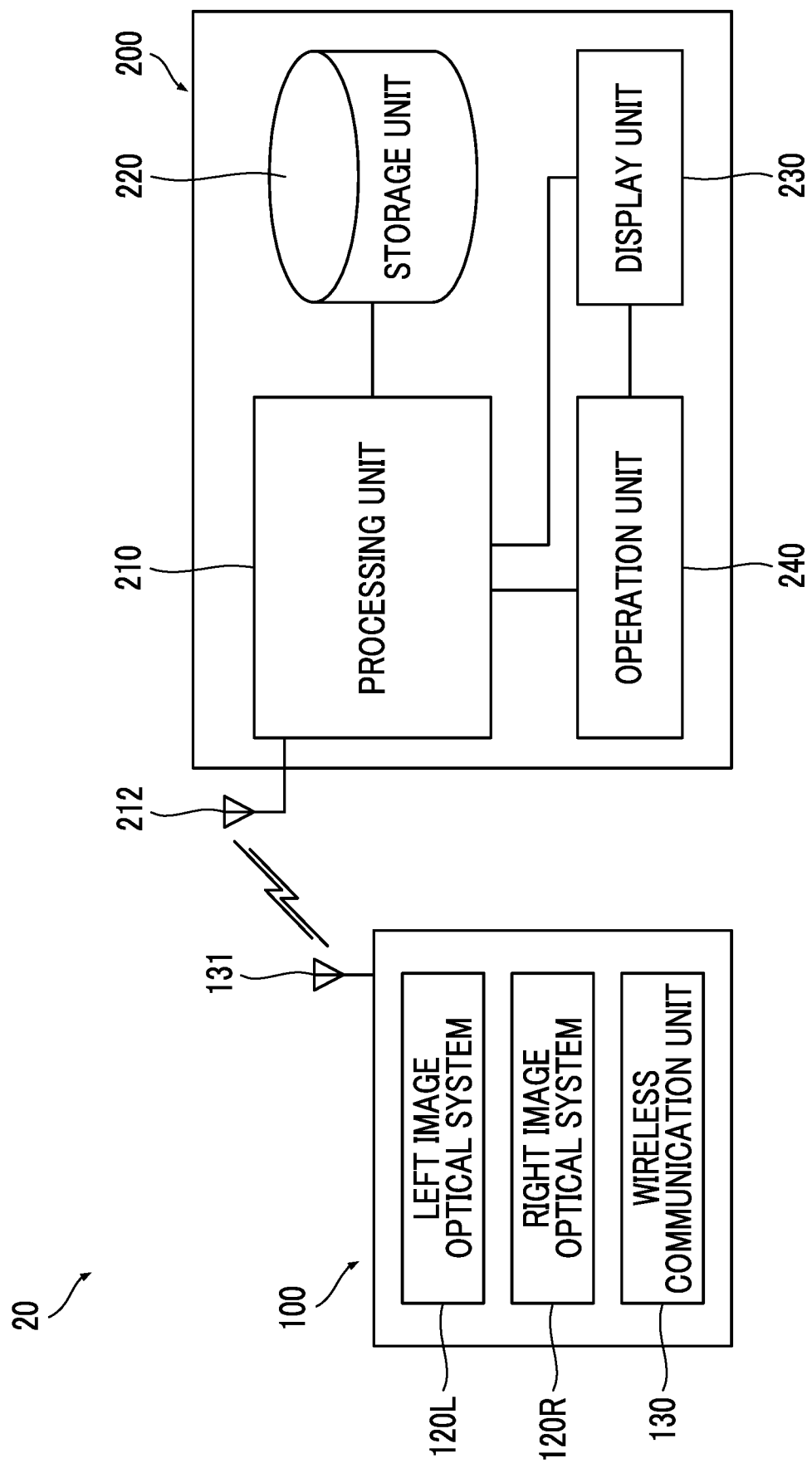
FIG. 17 is a diagram illustrating a configuration of an image processing system according to a second embodiment.

FIG. 17 is a block diagram illustrating an image processing system 20 according to the second embodiment. The image processing system 20 comprises a stereo optical system configured with a left image optical system 120L and a right image optical system 120R with which the digital camera 100 acquires images at different viewpoints (a left viewpoint and a right viewpoint), and is different from the image processing system 10 (refer to FIG. 2) according to the first embodiment in that planes are specified on the basis of stereo images acquired by the stereo optical system. In the image processing system 20 illustrated in FIG. 17, a constituent element common to FIG. 2 is given a like reference numeral, and a detailed description thereof will be omitted.

Figure 18:
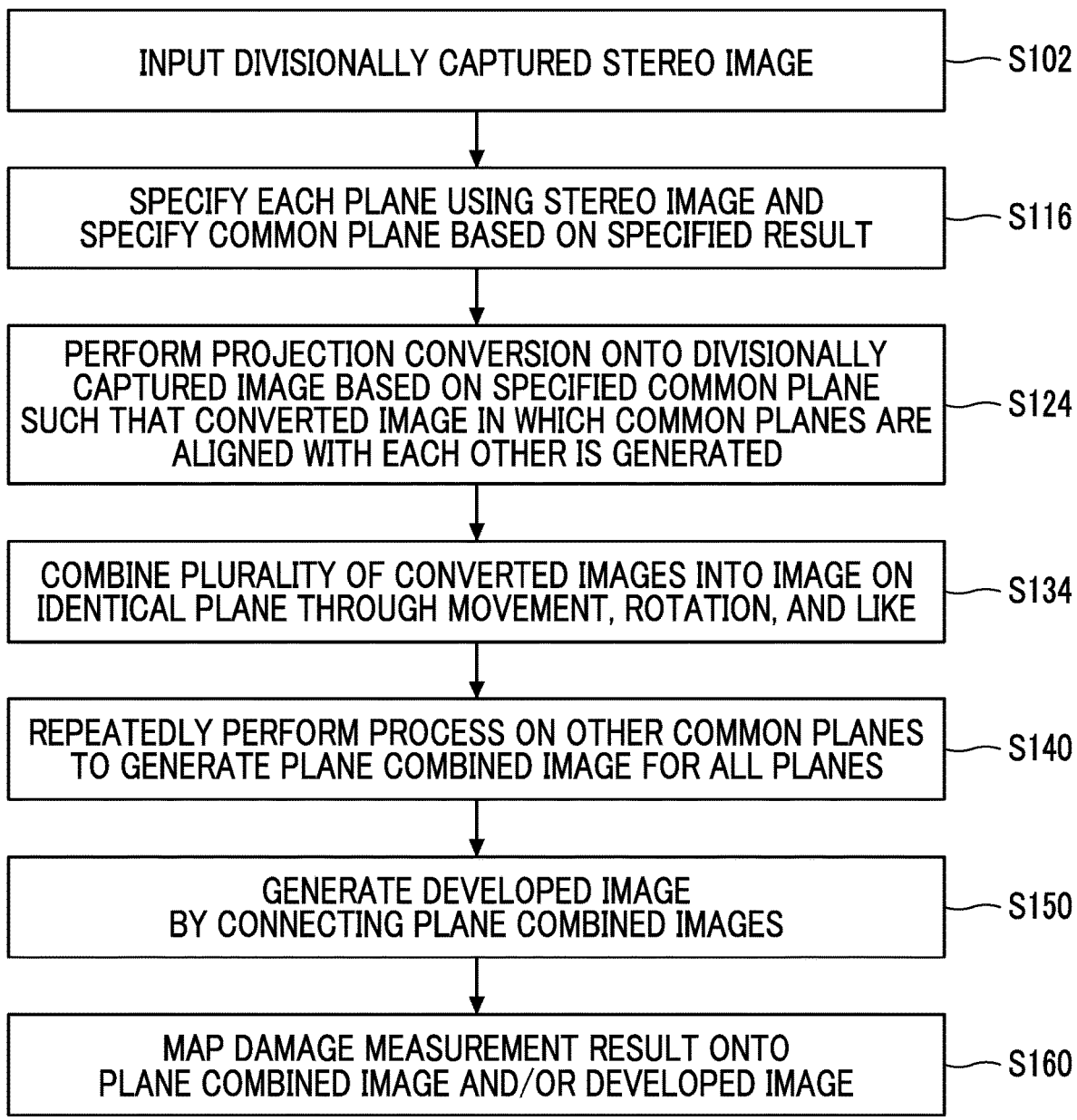
FIG. 18 is a flowchart illustrating image processing according to the second embodiment.

FIG. 18 is a flowchart illustrating a procedure of image processing in the image processing system 20. In the flowchart of FIG. 18, the same content as in FIG. 5 is given a like reference numeral, and a detailed description thereof will be omitted.

In the image processing system 20, in a case where a plurality of divisionally captured stereo images (a plurality of captured images) are input (step S102: image acquisition step), common planes are specified by using the input stereo images (step S116: plane specifying step). The common planes may be specified, for example, by extracting a geographical region based on a disparity that is obtained through block matching between input images or reduced images thereof, and a plane equation representing the extracted geographical region may be used. A processing target region may be set automatically or through a user's operation on the operation unit 240 in the input stereo images, and a plane may be specified in the set processing target region.

In a case where the common planes are specified, projection conversion is performed on the plurality of input images such that a plurality of converted images in which the common planes are aligned with each other are generated (step S124: image conversion step), and a plane combined image in which the plurality of converted images are combined into an image on an identical plane is generated through movement or rotation (step S134: combined image generation step). In a case where the plane combined image is generated, the processes are repeatedly performed on other surfaces in the same manner as in the first embodiment such that a plurality of plane combined images are generated (step S140: combined image generation step; refer to FIGS. 10A to 11B), and a developed image is generated by connecting the plane combined images to each other (step S150: developed image generation step; refer to FIG. 11A and FIG. 11B). Mapping of a damage measurement result and input of damage information (step S160: a damage mapping process or a damage information input step) may also be performed in the same manner as in the first embodiment (refer to FIGS. 12 to 14).

Through the processes, also in the second embodiment, even in a case where the bridge 1 (construction) formed of a plurality of planes (the floor slab 6 and the left and right main girders 2) having greatly different orientations are divisionally imaged, a combined image (plane combined image) can be easily generated based on specified common planes, and a developed image of the construction can be easily generated based on the plane combined image. Instead of acquiring stereo images with the stereo optical system, stereo images acquired already may be acquired via a recording medium or a network (in this case, the digital camera 100 may not be provided in the image processing system 20).

As mentioned above, the embodiments and the examples of the present invention have been described, but the present invention is not limited to the above aspects, and may be variously modified within the scope without departing from the spirit of the present invention. For example, a target construction is not limited to a bridge, and may be a tunnel or a building construction.

EXPLANATION OF REFERENCES

1: bridge
2: main girder
3: cross beam
4: sway bracing
5: lateral bracing
6: floor slab
10: image processing system
20: image processing system
100: digital camera
110: imaging optical system
120L: left image optical system
120R: right image optical system
130: wireless communication unit
131: antenna
200: system main body
210: processing unit
210A: image acquisition unit
210B: plane specifying unit
210C: image conversion unit
210D: combined image generation unit
210E: developed image generation unit
210F: feature point designation unit
210G: damage measurement unit
210H: damage mapping unit
210I: display control unit
210J: wireless communication unit
210K: image connection unit 210L: information input unit
212: antenna
220: storage unit
220A: captured image
220B: converted image
220C: plane combined image
220D: developed image
220E: damage measurement result
220F: damage information
220G: damage mapping image
230: display unit
240: operation unit
CP1: feature point
CP12: feature point
CP12X: feature point
CP2: feature point
FL1: frame
FL2: frame
Gx: coordinate axis
Gy: coordinate axis
Gz: coordinate axis
M1: graphic
M2: graphic
M3: graphic
M4: graphic
PA: surface
PB: surface
PC: surface
PD: surface
PE: surface
PF: surface
S100 to S160: respective steps in image processing method
VP1: viewpoint
VP2: viewpoint
i1: image
i12: connected image
i1A: converted image
i2: image
i2A: converted image
i3: image
i3A: plane combined image
i3B: plane combined image
i3C: plane combined image
i4: developed image

What is claimed is:

1. An image processing apparatus comprising a processor and a non-transitory, computer-readable tangible recording medium,
wherein the processor performs, by referring the recording medium:
an image acquisition processing that acquires a plurality of captured images obtained by respectively imaging different portions of a construction formed of a plurality of planes;
a plane specifying processing that specifies common planes common to the plurality of captured images, the common planes being one of the plurality of planes forming the construction;
an image conversion processing that performs projection conversion on images including the common planes among the plurality of captured images, to generate a plurality of converted images in which the common planes are aligned with each other;
a combined image generation processing that generates a plane combined image in which the plurality of converted images are combined with each other on an identical plane; and
a developed image generation processing that generates a developed image of the construction by connecting a plurality of the plane combined images to each other.

2. The image processing apparatus according to claim 1, wherein the processor further performs, by referring the recording medium:
a feature point designation processing that designates feature points of the construction in a first image and a second image included in the plurality of captured images,
wherein the image conversion processing performs projection conversion on the first image and the second image assuming that first feature points designated in the first image and second feature points designated in the second image are present on the common planes, to generate the plurality of converted images.

3. The image processing apparatus according to claim 2, wherein the image conversion processing forms a rectangular shape at each of the first feature points and the second feature points through projection conversion of the first image and the second image, and thus aligns the common planes with each other.

4. The image processing apparatus according to claim 2, wherein the feature point designation processing designates the first feature points and the second feature points based on a user operation using a display screen.

5. The image processing apparatus according to claim 1, wherein the image conversion processing forms a rectangular shape having designated vertical dimension and horizontal dimension in the images including the common planes, and thus aligns the common planes with each other.

6. The image processing apparatus according to claim 1, wherein the plane specifying processing comprises an image connection processing that generates a connected image by connecting the plurality of captured images to each other, and
wherein the image conversion processing performs projection conversion on the plurality of captured images assuming that third feature points designated in the connected image are present on the common plane, to generate the plurality of converted images.

7. The image processing apparatus according to claim 1, wherein the image acquisition processing acquires a plurality of stereo images as the plurality of captured images, and
wherein the plane specifying processing specifies the common planes based on the plurality of stereo images.

8. The image processing apparatus according to claim 1, wherein the processor further performs, by referring the recording medium:
a damage mapping processing that maps a measurement result of damage to the construction onto at least one of the plane combined image or the developed image.

9. The image processing apparatus according to claim 8, wherein the processor further performs, by referring the recording medium:
an information input processing that inputs information regarding the damage based on a user operation using a display screen.

10. An image processing method comprising:
an image acquisition step of acquiring a plurality of captured images obtained by respectively imaging different portions of a construction formed of a plurality of planes;
a plane specifying step of specifying common planes common to the plurality of captured images, the common planes being one of the plurality of planes forming the construction;
an image conversion step of performing projection conversion on images including the common planes among the plurality of captured images, to generate a plurality of converted images in which the common planes are aligned with each other;
a combined image generation step of generating a plane combined image in which the plurality of converted images are combined with each other on an identical plane; and
a developed image generation step of generating a developed image of the construction by connecting a plurality of the plane combined images to each other.

11. A non-transitory, computer-readable tangible recording medium which records a program for causing a computer to perform:
an image acquisition step of acquiring a plurality of captured images obtained by respectively imaging different portions of a construction formed of a plurality of planes;
a plane specifying step of specifying common planes common to the plurality of captured images, the common planes being one of the plurality of planes forming the construction;
an image conversion step of performing projection conversion on images including the common planes among the plurality of captured images, to generate a plurality of converted images in which the common planes are aligned with each other;
a combined image generation step of generating a plane combined image in which the plurality of converted images are combined with each other on an identical plane; and
a developed image generation step of generating a developed image of the construction by connecting a plurality of the plane combined images to each other.

* * * * *